(12) United States Patent
Kaliski, Jr. et al.

(10) Patent No.: US 6,286,022 B1
(45) Date of Patent: Sep. 4, 2001

(54) EFFICIENT FINITE FIELD BASIS CONVERSION INVOLVING A DUAL BASIS

(75) Inventors: Burton S. Kaliski, Jr., Wellesley; Moses Liskov, Waltham, both of MA (US)

(73) Assignee: RSA Security Inc., Bedford, MA (US)

( * ) Notice: Subject to any disclaimer, the term of this patent is extended or adjusted under 35 U.S.C. 154(b) by 0 days.

(21) Appl. No.: 09/195,346

(22) Filed: Nov. 18, 1998

Related U.S. Application Data

(60) Provisional application No. 60/066,937, filed on Nov. 18, 1997.

(51) Int. Cl.[7] .................................................. G06F 7/00

(52) U.S. Cl. .................................................. 708/492

(58) Field of Search ........................... 708/492; 380/28

(56) References Cited

U.S. PATENT DOCUMENTS

| | | | |
|---|---|---|---|
| 4,410,989 | 10/1983 | Berlekamp | 371/40 |
| 4,567,568 | 1/1986 | Inagawa et al. | 364/761 |
| 4,587,627 | 5/1986 | Omura et al. | 364/754 |
| 4,745,568 | 5/1988 | Onyszchuk et al. | 364/754 |
| 4,994,995 | 2/1991 | Anderson et al. | 364/746.1 |
| 5,206,824 * | 4/1993 | Arazi | 708/492 |
| 5,227,992 | 7/1993 | Lee et al. | 364/746.1 |
| 5,467,297 | 11/1995 | Zook | 364/746.1 |
| 5,555,516 | 9/1996 | Zook | 364/746.1 |
| 5,854,759 | 12/1998 | Kaliski, Jr. et al. | 364/746.1 |
| 5,931,894 * | 8/1999 | Wei | 708/492 |
| 5,982,895 | 11/1999 | Dworkin et al. | 380/28 |
| 6,009,450 | 12/1999 | Dworkin et al. | 708/492 |
| 6,049,815 * | 4/2000 | Lambert et al. | 708/492 |
| 6,052,704 * | 4/2000 | Wei | 708/492 |

OTHER PUBLICATIONS

Beth et al., "Architectures for Exponentiation in GF($2^n$)," 263 Lecture Notes in Computer Science 302–310 (1986).

Fenn et al., "Finite Field Inversion Over the Dual Basis," 4(1) IEEE Transactions in Very Large Scale Integration (VLSI) Systems 134–137 (Mar. 1996).

Hsu et al., "A Comparison of VLSI Architecture of Finite Field Multipliers Using Dual, Normal, or Standard Bases," 37(6) IEEE Transactions on Computers 735–739 (Jun. 1988).

(List continued on next page.)

Primary Examiner—Tan V. Mai
(74) Attorney, Agent, or Firm—Testa, Hurwitz & Thibeault, L

(57) ABSTRACT

The invention provides apparatus and methods for use in basis conversion involving a dual basis, such as a dual of a polynomial basis or dual of a normal basis. The invention in an illustrative embodiment includes basis generators for generating elements of a dual of a polynomial or a normal basis of a finite field GF($q^m$), where q is a prime number or power of a prime number and m is an integer greater than or equal to 2. The basis generators can be used in "import" basis conversion, such as converting a representation in an external basis to a representation in an internal dual of a polynomial basis or dual of a normal basis, as part of a generate-accumulate algorithm, or in "export" basis conversion, such as converting a representation in an internal dual of a polynomial basis or dual of a normal basis to a representation in an external basis, as part of a generate-evaluate algorithm. The invention also includes basis shifters which generate a shifted version of a representation in an internal polynomial or normal basis. The basis shifters may be used in import basis conversion as part of a shift-insert algorithm, or in export basis conversion as part of a shift-extract algorithm. The basis shifters may also be used to provide alternative shift-based basis generators. The basis conversion techniques of the invention significantly increase the storage and computational efficiency of dual basis operations in cryptographic systems and other applications.

31 Claims, 13 Drawing Sheets

OTHER PUBLICATIONS

Koc, et al., "Low–Complexity Bit–Parallel Canonical and Normal Basis Multipliers for a Class of Finite Fields," 47(3) *IEEE Transactions on Computers* 353–356 (Mar. 1998).

Lee et al., "A New Aspect of Dual Basis for Efficient Field Arithmetic," *IEEE* 1–17 (1998).

Stinson, "On Bit–Serial Multiplication and Dual Basis in $GF(2^m)$," 37(6) *IEEE Transactions on Information Theory* 1733–1736 (1991).

von zur Gathen, "Efficient and Optimal Exponentiation in Finite Fields," 1 *Computational Complexity* 360–394 (1991).

Wang et al., "Bit Serial Multiplication in Finite Fields," 3(1) *SIAM J. Disc. Math.* 140–148 (Feb. 1990).

Willett, "Arithmetic in a Finite Field," 35 *Mathematics of Computation* 1353–1359 (1980).

Fenn et al., "$GF(2^m)$ Multiplication and Division Over the Dual Basis," 45(3) *IEEE Transactions on Computers* 319–327 (Mar. 1996).

Mastrovito, "Exponentiation over Finite Fields $GF(2^m)$. A Comparison of Polynomial and Normal Basis Designs with Respect to VLSI Implementation," $4^{th}$ Joint Swedish–Soviet International Workshop on Information Theory 260–266 (Aug. 1989).

* cited by examiner

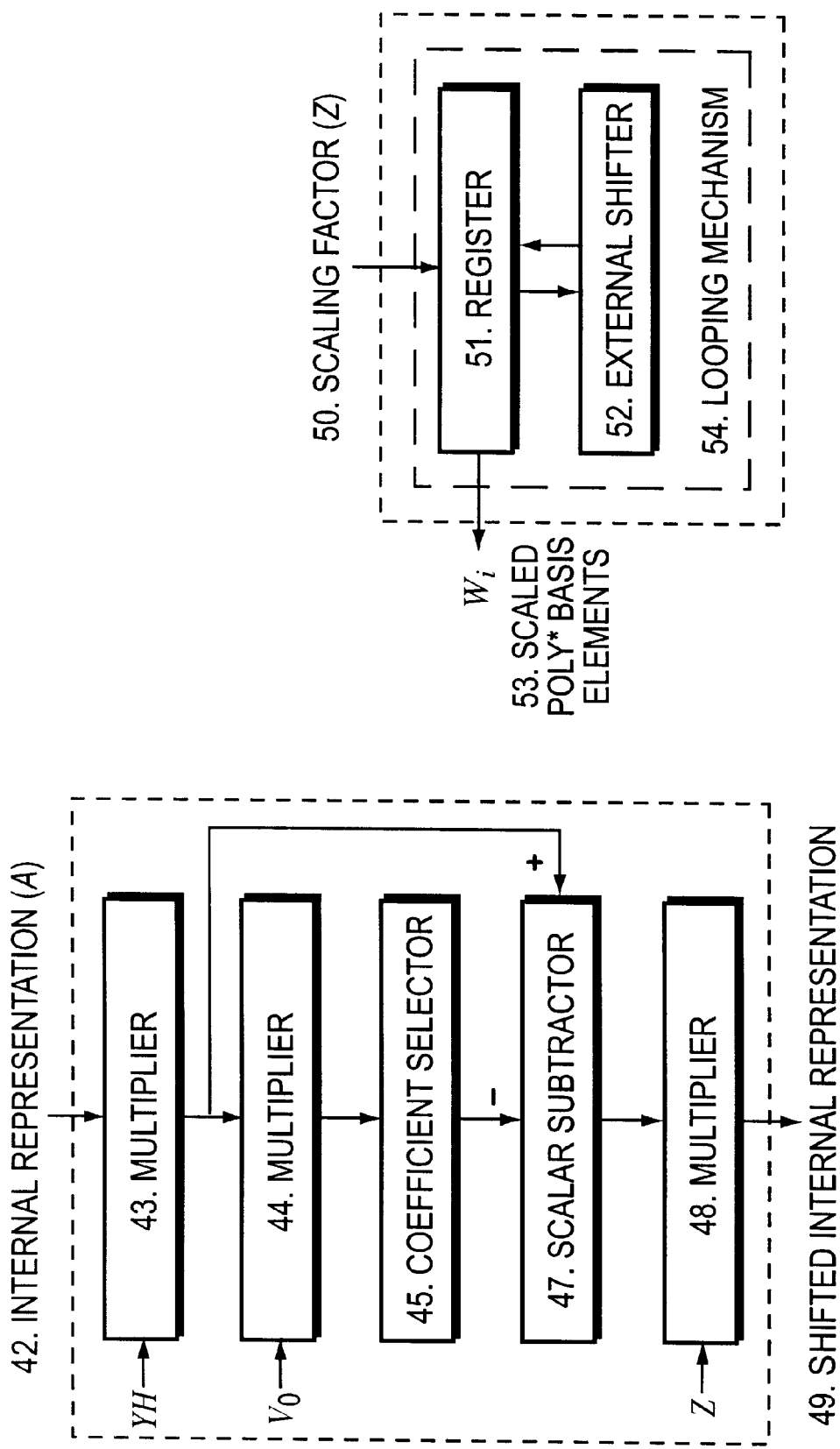

EFFICIENT FINITE FIELD BASIS CONVERSION INVOLVING A DUAL BASIS

RELATED APPLICATION

The present application claims the benefit of U.S. Provisional Application Ser. No. 60/066,937 filed on Nov. 18, 1997.

FIELD OF THE INVENTION

The present invention relates generally to techniques for converting signals of a finite field having one basis to signals of a finite field having another basis, and more particularly to finite field basis conversion techniques which involve a dual basis.

BACKGROUND OF THE INVENTION

As described in U.S. application Ser. No. 08/851,045, filed in the name of inventors Burton S. Kaliski Jr. and Yiqun Lisa Yin on May 5, 1997 and entitled "Methods and Apparatus for Efficient Finite Field Basis Conversion," and which is incorporated by reference herein, conversion between different choices of basis for a finite field is an important problem in today's computer systems, particularly for cryptographic operations. While it is possible to convert between two choices of basis by matrix multiplication, the matrix may be too large for some applications, hence the motivation for more storage-efficient techniques.

Elements of a finite field can be represented in a variety of ways, depending on the choice of basis for the representation. Let $GF(q^m)$ be the finite field, and let $GF(q)$ be the ground field over which it is defined, where q is a prime or a prime power. The characteristic of the field is p where $q=p^r$ for some $r \geq 1$. For even-characteristic fields, p=2. The degree of the field is m; its order is $q^m$. A basis for the finite field is a set of m elements $\omega_0, \ldots, \omega_{m-1} \in GF(q^m)$ such that every element of the finite field can be represented uniquely as a linear combination of basis elements:

$$\varepsilon = \sum_{i=0}^{m-1} B[i]\omega_i$$

where $B[0], \ldots, B[m-1] \in E\ GF(q)$ are the coefficients. Two common types of basis are a polynomial basis and a normal basis. In a polynomial basis, the basis elements are successive powers of an element $\gamma$, called the generator:

$$\omega_i = \gamma^i.$$

A polynomial $f$ of degree m, called the minimal polynomial of $\gamma$, relates the successive powers:

$$\gamma^m + f_{m-1}\gamma^{m-1} + f_{m-2}\gamma^{m-2} + \ldots + f_1\gamma + f_0 = 0.$$

In a normal basis, the basis elements are successive exponentiations of an element $\gamma$, again called the generator:

$$\omega_i = \gamma^{q^i}.$$

Another common type of basis is a dual basis. Let $\omega_0, \ldots, \omega_{m-1}$ be a basis and let h be a nonzero linear function from $GF(q^m)$ to $GF(q)$, i.e., a function such that for all $\epsilon, \phi$, $$h(\epsilon+\phi)=h(\epsilon)+h(\phi).$$

The dual basis of the basis $\omega_0, \ldots, \omega_{m-1}$ with respect to h is the basis $\xi_0, \ldots, \xi_{m-1}$ such that for all i,j, $$h(\omega_i \xi_j) = \begin{cases} 1 & \text{if } i = j; \\ 0 & \text{otherwise.} \end{cases}$$

The dual basis is uniquely defined, and duality is syrnnetric: the dual basis with respect to h of the basis $\xi_0, \ldots, \xi_{-1}$ is the basis $\omega_0, \ldots, \omega_{m-1}$. A dual basis can be defined for a polynomial basis, a normal basis, or any other choice of basis, and with respect to a variety of functions (including, as an example, the function that evaluates to a particular coefficient of the representation of the field element in some basis).

The basis conversion or change-of-basis problem is to compute the representation of an element of a finite field in one basis, given its representation in another basis. The problem has two forms, which distinguish between the internal basis in which finite field operations are performed, and the external basis to and from which one is converting:

Import problem. Given an internal basis and an external basis for a finite field $GF(q^m)$ and the representation B of a field element in the external basis (the "external representation"), determine the corresponding representation A of the same field element in the internal basis (the "internal representation").

Export problem. Given an internal basis and an external basis for a finite field $GF(q^m)$ and the internal representation A of a field element, determine the corresponding external representation B of the same field element.

A conventional solution to both problems is to apply a change-of-basis matrix relating the two a bases. However, as the matrix is potentially quite large, and as the operations involved are not necessarily implementable with operations in either basis, the matrix-based conversion process may be inefficient in many important applications.

Another approach to conversion is to compute with a dual basis. Consider the problem of converting to the basis $\omega_0, \ldots, \omega_{m-1}$, and let $\xi_0, \ldots, \xi_{m-1}$ be its dual basis with respect to some linear function h. Then by the definition of the dual basis and the linearity of h, it follows that for all i, $$B[]=h(\epsilon \xi_i).$$

One can therefore convert by multiplying by elements of the dual basis and evaluating the function h, another straightforward and effective solution, which is efficient provided that the elements of the dual basis $\xi_0, \ldots, \xi_{m-1}$ can be generated efficiently and that the function h can be computed efficiently. But this approach is again limited by a number of difficulties. First, the approach requires the elements of the dual basis, which must either be stored in the form of $m^2$ coefficients, or computed. Second, it requires the computation of the function h, which may or may not be efficient. More practical choices of h have been suggested, such as a particular coefficient of the representation in some basis. See, for example, S. T. J. Fenn, M. Benaissa, and D. Taylor, "Finite Field Inversion Over the Dual Basis," IEEE Transactions on VLSI, 4(1):134–137, March 1996, which is incorporated by reference herein. But even with a more practical h, there still remains the problem of determining the dual basis efficiently. Moreover, the Fenn et al. method is efficient only when m is very small, and no general efficient conversion algorithm is given.

A number of other references describe finite field basis conversion operations involving dual basis. For example, U.S. Pat. No. 4,994,995, issued Feb. 19, 1991 to R. W. Anderson, R. L. Gee, T. L. Nguyen, and M. A. Hassner, entitled "Bit-Serial Division Method and Apparatus," describes hardware for a converter which converts an element in $GF(2^m)$ in a polynomial basis representation to a scalar multiple of its dual basis representation, where the scalar is an element of the field. The scalar is chosen so that the scalar multiple of the dual has many of the same elements as the polynomial basis. The hardware consists of AND gates, XOR gates, and a table for computing the trace function. Again, no general conversion algorithm is suggested. I. S. Hsu, T. K. Truong, L. J. Deutsch, and I. S. Reed, "A Comparison of VLSI Architecture of Finite Field Multipliers using Dual, Normal, or Standard Bases," IEEE Transactions on Computers, 37(6):735–739, June 1988, discloses conventional techniques for converting between polynomial and dual bases. D. R. Stinson, "On Bit-Serial Multiplication and Dual Bases in $GF(2^m)$," IEEE Transactions on Information Theory, 37(6):1733–1737, November 1991, describes change-of-basis matrices between polynomial and dual bases. Given it polynomial basis such that the change-of-basis matrix M from the dual basis to some scalar ($c \epsilon$ $GF(2^m)$) times the polynomial basis has as few "1" entries as possible, efficient bit-serial multiplication is possible. Given the minimal polynomial of $\alpha$, a generator of the polynomial basis, the Stinson reference gives simple formulae computing a scalar c and the weight of the matrix M. Although the above-cited references disclose numerous conventional techniques for converting between a polynomial basis and its dual basis, these techniques are generally inefficient in terms of memory, and may also be inefficient in terms of computation time.

The above-cited U.S. application Ser. No. 08/851,045 introduced the "shift-extract" technique of basis conversion, and also provided several storage-efficient and computation-efficient algorithms based on that technique for converting to and from a polynomial or normal basis. The conversion algorithms described therein overcome many of the problems associated with the previously-described conventional approaches. However, a need remains for further improvements in finite field basis conversion, particularly with regard to techniques involving dual basis.

It is therefore an object of the present invention to provide efficient finite field basis conversion techniques involving dual basis which do not require an excessively large amount of storage or an excessively large number of operations, and which take advantage of the built-in efficiency of finite field operations in one basis, rather than implementing new operations such as matrix multiplications.

SUMMARY OF THE INVENTION

The invention provides apparatus and methods for use in basis conversion involving dual basis, such as a dual of a polynomial basis or dual of a normal basis. For example, the invention includes efficient basis generators for generating the dual of a polynomial or normal basis. In accordance with the invention, these generators are implemented in generate-accumulate import basis converters and conversion algorithms, and generate-evaluate export basis converters and conversion algorithms. The invention also includes efficient basis shifters for performing shifting operations in a dual of a polynomial basis or normal basis. In accordance with the invention, these basis shifters are implemented in shift-insert import basis converters and conversion algorithms, and shift-extract export basis converters and conversion algorithms. The basis shifters may also be used to provide alternative shift-based basis generators.

The basis conversion techniques of the invention significantly increase the storage and computational efficiency of dual basis conversion operations in cryptographic systems and other applications, relative to the conventional dual basis conversion approaches described previously. The basis converters and conversion algorithms in accordance with the invention are computationally efficient in that they involve primarily or exclusively finite-field operations, rather than more complex operations such as matrix multiplications, and thus benefit from available optimizations for finite-field operations. The invention may be used, for example, to convert from a polynomial basis or a normal basis to a corresponding dual basis, and vice versa, in order to simplify cryptographic operations. These and other features of the present invention will become more apparent from the accompanying drawings and the following detailed description.

BRIEF DESCRIPTION OF THE DRAWINGS

FIG. 6 shows a polynomial* basis external shifter in accordance with the present invention.

FIG. 7 shows an alternative polynomial* basis generator in accordance with the present invention.

DETAILED DESCRIPTION OF THE INVENTION

Figure 1:
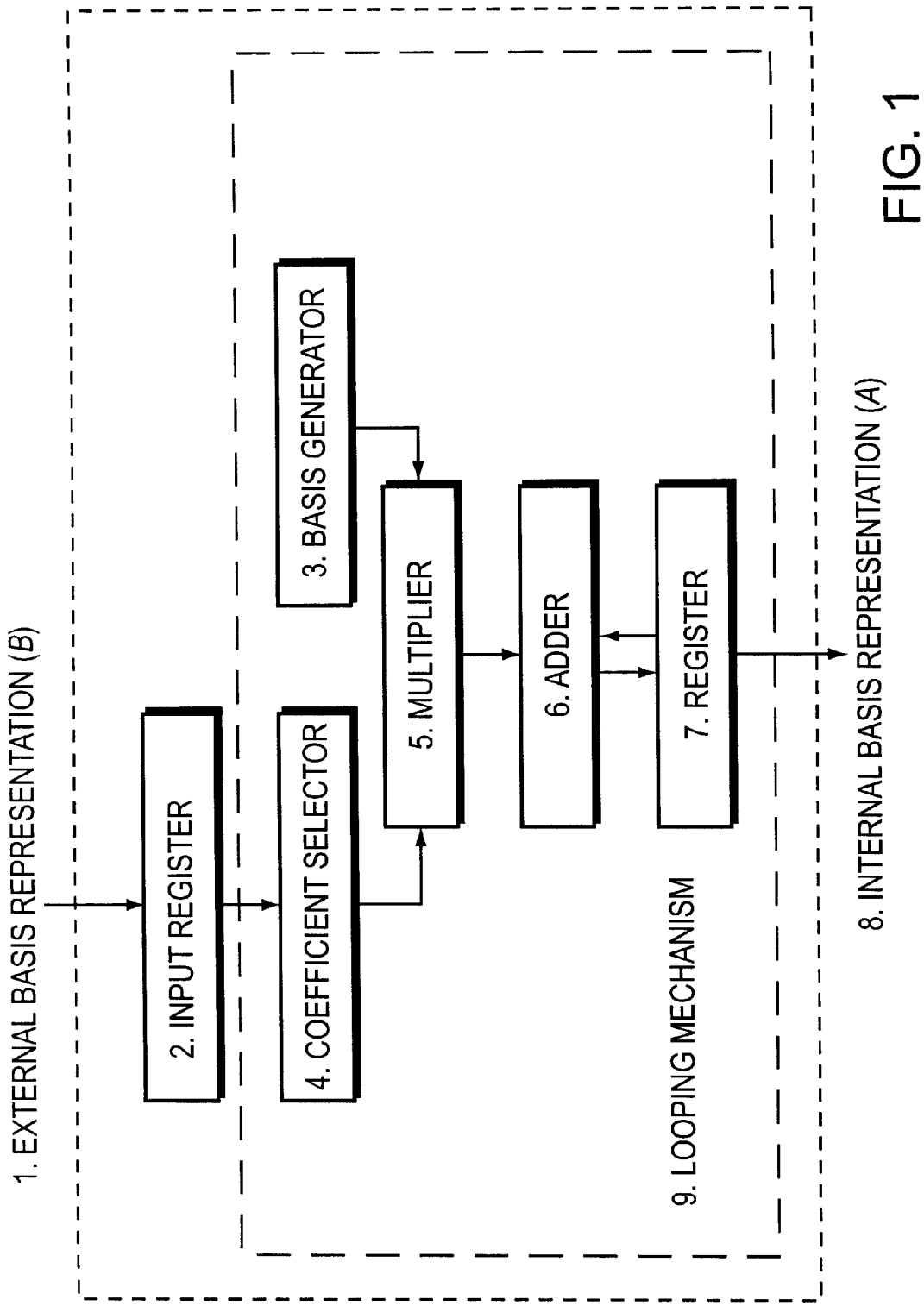
FIG. 1 shows a basis converter which performs import operations using a generate-accumulate method in accordance with the present invention.

The present invention will be described in several sections below in accordance with the following outline.

Overview of Basis Conversion Techniques
    1.1 Import Algorithms
        1.1.1 Generate-Accumulate Method
        1.1.2 Shift-Insert Method
    1.2 Export Algorithms
        1.2.1 Generate*-Evaluate Method
        1.2.2 Shift-Extract Method
    1.3 Summary Tables
2.0 Techniques Involving the Dual of a Polynomial Basis
    2.1 Efficient Basis Generation
        2.1.1 Importing from a Polynomial* Basis by Generate-Accumulate
        2.1.2 Exporting to a Polynomial Basis by Generate*-Evaluate 2.2 Efficient External Shifting
  2.2.1 Importing from a Polynomial* Basis by Shift-Insert
  2.2.2 Exporting to a Polynomial* Basis by Shift-Extract
3.0 Techniques Involving the Dual of a Normal Basis
  3.1 Efficient Basis Generation
    3.1.1 Importing from a Normal* Basis by Generate-Accumulate
    3.1.2 Exporting to a Normal Basis by Generate*-Evaluate
  3.2 Efficient External Shifting
    3.2.1 Importing from a Normal* Basis by Shift-Insert
    3.2.2 Exporting to a Normal* Basis by Shift-Extract
4.0 Applications As noted above, U.S. application Ser. No. 08/851,045 introduced the "shift-extract" technique of basis conversion, and also provided several storage-efficient algorithms based on that technique for converting to a polynomial or normal basis. The present invention provides techniques involving the dual of a polynomial or normal basis, including storage-efficient generation of a dual basis and storage-efficient shifting in such a basis. The present invention may be used in combination with the "shift-extract" technique of U.S. application Ser. No. 08/851,045 as well as other basis conversion techniques, but also provides several new storage-efficient and computation-efficient algorithms for converting to and from the dual of a polynomial or normal basis, as well as additional algorithms for converting to a polynomial or normal basis. Like the invention described in U.S. application Ser. No. 08/851,045, the present invention applies both to even-characteristic and odd-characteristic finite fields of degree greater than one, though even-characteristic processing is the most likely application since it is generally more common in practice. It should be noted that in certain special cases, a given dual basis may be the same as the corresponding polynomial or normal basis. These so-called "self-dual" bases can be generated using conventional techniques, and thus do not require the dual basis techniques described herein.

1.0 Overview of Basis Conversion Techniques

An overview of the basis conversion techniques of the present invention will now be provided. Algorithms for particular choices of basis will then be described in greater detail in subsequent sections. In the following description, the dual of a polynomial basis will be denoted as a polynomial* basis, and the dual of a normal basis will be denoted as a normal* basis. Although the problem of conversion between two choices of basis involving different ground fields is not addressed in this description, it will be apparent to those skilled in the art that the described techniques can be readily applied to this problem in a straightforward manner, as illustrated in U.S. application Ser. No. 08/851,045.

It should also be noted that for all the techniques described, it may be possible to improve efficiency by working with a scaled version of the intended basis, as the conversion process may be simpler for certain scaling factors. During an export operation, the element to be converted would be multiplied by the scaling factor before conversion to the external basis, and during an import operation, the element would be multiplied by the inverse of the scaling factor after conversion. Since a scaled version of a basis is also in general a basis, the general techniques described herein apply, the multiplication by the scaling factor or its inverse being considered simply as an additional processing step.

1.1 Import Algorithms

Given an internal basis and an external basis for a finite field and the representation B of a field element in the external basis, an import algorithm determines the corresponding representation A of the same field element in the internal basis. Two general methods for determining the internal representation A are described below: the generate-accumulate method and the shift-insert method.

1.1.1 Generate-Accumulate Method

The Generate-Accumulate method computes the internal representation A by accumulating the products of coefficients B[i] with successive elements of the external basis, as the equation $$A = \sum_{i=0}^{m-1} B[i] W_i$$

where $W_0, \ldots, W_{m-1}$ are the internal-basis representations of the elements of the external basis. The basic form of algorithm for this method, which is well known in the prior art, is as follows:

```
proc IMPORTBYGENACCUM
    A ← 0
    for i from 0 to m-1 do
        A ← A + B[i] × W_i
    end for
end proc
```

As written, this conventional algorithm requires storage for the m values $W_0, \ldots, W_{m-1}$, and is therefore not storage efficient. To reduce the storage requirement, it is necessary to generate the values as part of the algorithm. This is straightforward when the external basis is a polynomial basis or a normal basis. The variant algorithm mentioned in the conjunction with the algorithms IMPORTPOLY and IMPORTNORMAL in U.S. application Ser. No. 08/851,045 follows this method.

FIG. 1 shows a basis converter which implements the Generate-Accumulate import algorithm. An external basis representation (B) 1 is stored in an input register 2. At each step of a looping mechanism 9, a coefficient selector 4 and a basis generator 3 respectively select and generate the pair (B[i], $W_i$), which are multiplied in a multiplier 5, and accumulated by an adder 6 into an output register 7. Unless otherwise stated, all output registers shown herein are assumed to hold the value zero initially, or to be initialized to zero before the start of the conversion algorithm. Once the loop is finished, the content of register 7 is output as an internal representation (A) 8. The basis generator 3 could be, for example, a polynomial* basis generator (see FIG. 5), a normal* basis generator (see FIG. 8), or a normal or polynomial basis generator.

The present invention provides algorithms for generating the values for a polynomial* or normal* basis, called GENPOLY* and GENNORMAL*, which lead to two new conversion algorithms for polynomial* and normal* bases, IMPORTPOLY*BYGENACCUM and IMPORTNORMAL*BYGENACCUM.

1.1.2 Shift-Insert Method

The Shift-Insert method computes the internal representation A by "shifting" an intermediate variable in the external basis, and inserting successive coefficients between the shifts. This follows the same concept as the shift-extract method to be described below. Let SHIFT be a function that shifts an element in the external basis, i.e., a function such as one which given the internal representation of an element with external representation B[0]B[1] . . . B[m−2]B[m−1]

computes the internal representation of the element with external representation B[m−1]B[0] . . . B[m−3]B[m−2].

Other forms of shifting are possible, including shifting in the reverse direction, or shifting where the value 0 rather than B[m−1] is shifted in.

The basic form of algorithm for this method is as follows:

```
proc IMPORTBYSHIFTINSERT
    A ← 0
    for i from m-1 down to 0 do
        SHIFT(A)
        A ← A + B[i] × W_0
    endfor
endproc
```

The direction of the for loop may vary depending on the direction of the shift. The algorithm has the advantage over IMPORTBYGENACCUM that more than one coefficient can readily be processed per iteration, regardless of the basis. If one wishes to reduce the number of shifts by at factor of k, k-fold insertion can be performed at each iteration of the loop. If k does not divide m, some of the insertions may have to be performed outside of the loop (in IMPORTBYGENACCUM, a similar improvement can only be done for certain choices of basis). However, an efficient SHIFT function is required. The algorithms IMPORTPOLY and IMPORTNORMAL in U.S. application Ser. No. 08/851,045 follow this method.

Figure 2A:
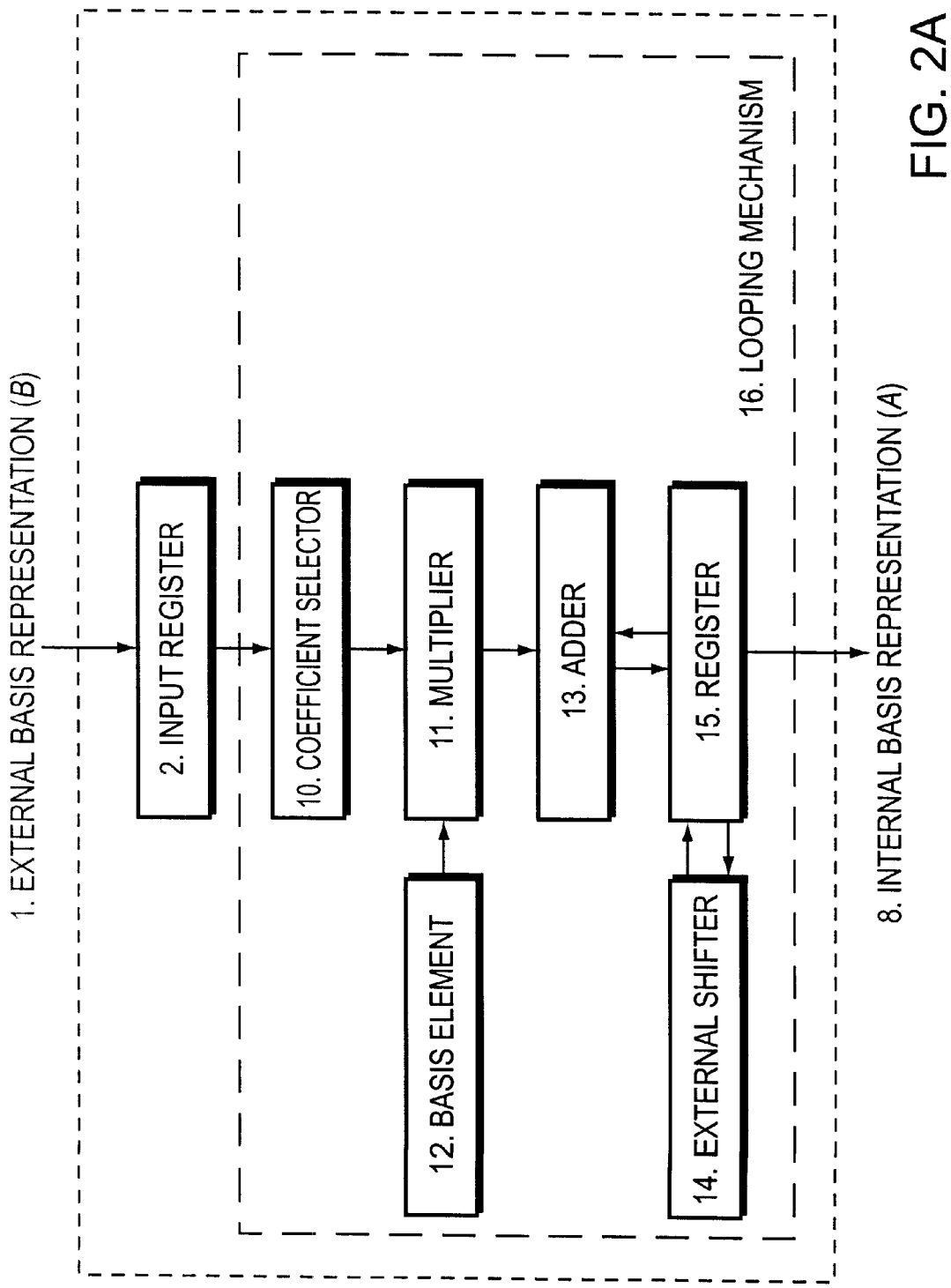
FIGS. 2A and 2B show basis converters which perform import operations using a shift-insert method in accordance with the present invention.

FIG. 2A shows a basis converter which implements the Shift-Insert import algorithm. The external basis representation 1 is stored in the input register 2. At each step of a looping mechanism 16, a coefficient selector 10 selects one coefficient B[i] of the external representation. This element is then multiplied by a predetermined basis element 12, and added by an adder 13 into a register 15. Then, the register 15 is shifted by an external shifter 14. Once the loop is finished, the content of register 15 is output as the internal basis representation 8.

Figure 2B:
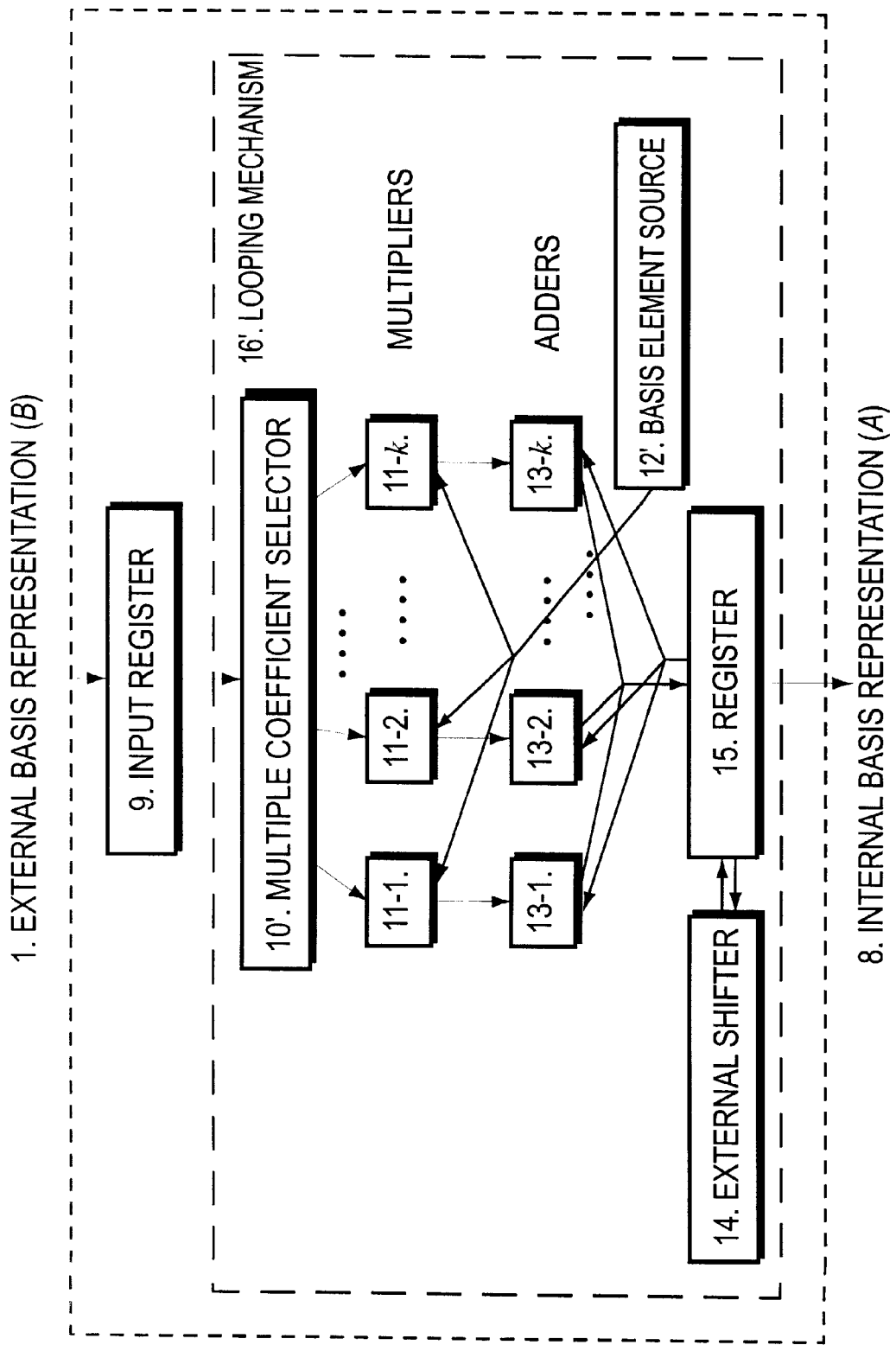

FIG. 2B shows a basis converter which implements the above-described k-fold optimization of the Shift-Insert import algorithm. The external basis representation 1 is stored in an input register 9. A multiple coefficient selector 10' selects k elements of the array, each of which is multiplied by different basis elements from a basis element source 12' via the multipliers 11-1, 11-2, . . . , 11-k, and accumulated by the adders 13-1, 13-2, . . . , 13-k into the register 15. Alternatively, the multiple coefficient selector 10' could be k separate coefficient selectors. Note that the multiplications could be done in parallel. The external shifter 14 in FIGS. 2A and 2B could be, for example, a polynomial* basis external shifter (see FIG. 6), a normal* basis external shifter (see FIG. 9), or a normal or polynomial basis external shifter (see U.S. application Ser. No. 08/851,045).

The present invention provides algorithms for shifting in a polynomial* or normal* basis, called SHIFTPOLY* and SHIFTNORMAL*, which lead to two new conversion algorithms for polynomial* and normal* bases, IMPORTPOLY*BYSHIFTINSERT and IMPORTNORMAL*BYSHIFTINSERT. Alternative forms of GENPOLY* and GENNORMAL* and hence IMPORTPOLY*BYGENACCUM and IMPORTPNORMAL*BYGENACCUM may also be obtained from the SHIFT functions, as it is possible to generate the internal representations of the elements of an external basis by repeated application of SHIFT.

1.2 Export Algorithms

Given an internal basis and an external basis for a finite field and the representation A of a field element in the internal basis, an export algorithm determines the corresponding representation B of the same field element in the internal basis. Two general methods for determining the external representation B are described: the generate*-evaluate method and the shift-extract method.

1.2.1 Generate*-Evaluate Method

The Generate*-Evaluate method computes the external representation B by evaluating products of A with successive elements of a dual of the external basis, as in the equation $$B[i]=h(AX_i)$$

where h is a linear function and $X_0, \ldots, X_{m-1}$ are the internal-basis representations of the elements of the dual of the external basis with respect to the function h. (The "Generate*" designation refers to the fact that the dual basis is generated.) The basic form of algorithm for this method, which is well known in the prior art, is as follows:

```
proc EXPORTBYGEN*EVAL
    for i from 0 to m-1 do
        T ← A × X_i
        B[i] ← h(T)
    end for
end proc
```

A variation on this conventional algorithm is to generate the values $AX_0, \ldots, AX_{m-1}$ directly, which can save a multiplication during each iteration. The algorithms GENPOLY* and GENNORMAL* are easily adapted to this approach. The choice of function h and the consequent choice of dual basis is generally not important as far as the correctness of the algorithm, though some choices may lead to more efficient implementations than others. For instance, the choice h(T)=T[0] is particularly efficient. The conventional algorithm EXPORTBYGEN*EVAL requires storage for m values, and, as was the case for the conventional algorithm IMPORTBYGENACCUM, to reduce the storage requirement, it is necessary to generate the values as part of the algorithm.

Figure 3A:
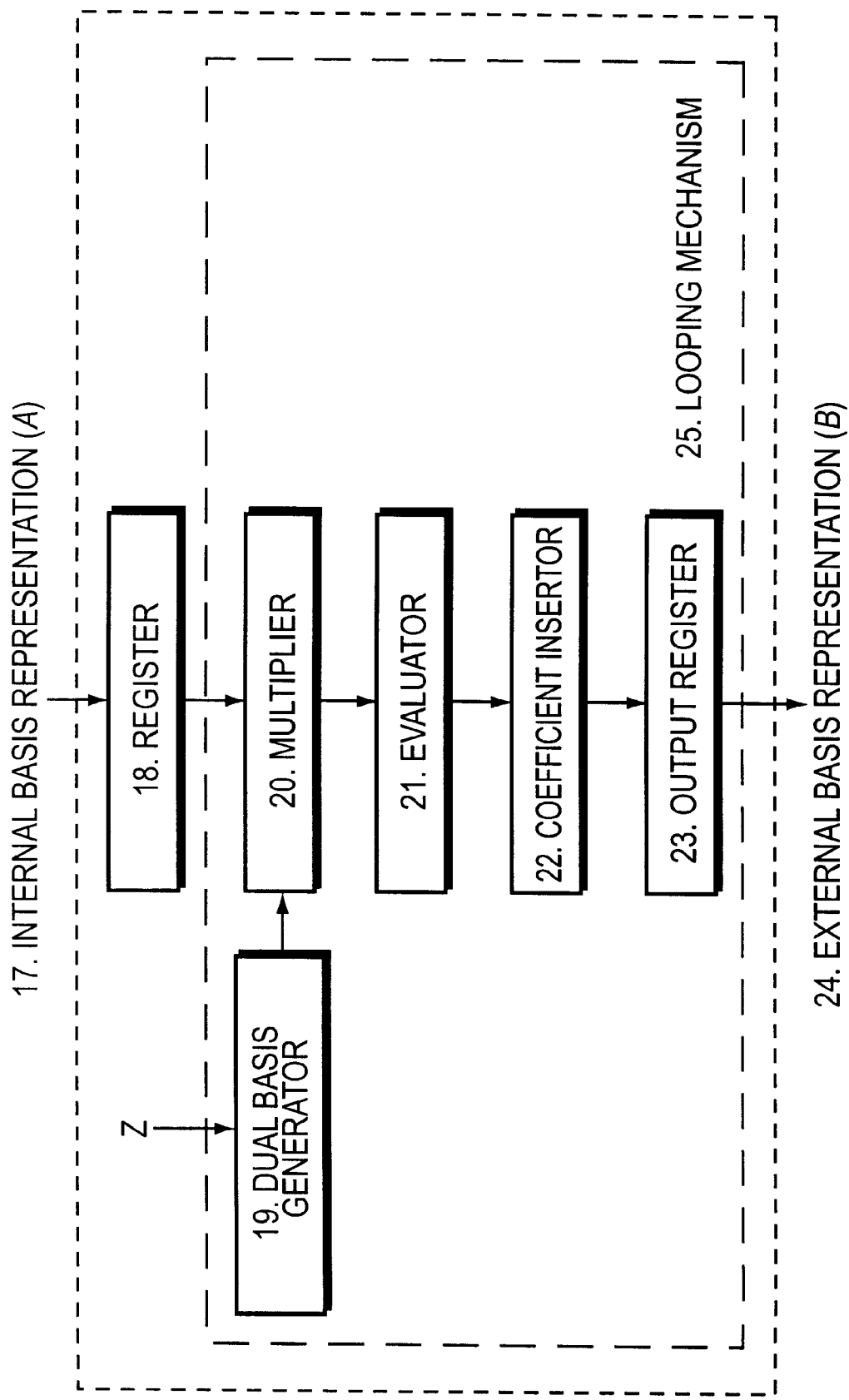
FIGS. 3A and 3B show basis converters which perform export operations using a generate*-evaluate method in accordance with the present invention.

FIG. 3A shows a basis converter implementing the Generate*-Evaluate export algorithm. An internal basis representation 17 is stored in a register 18. At each step of a looping mechanism 25, a dual basis generator 19 outputs a dual basis element $X_i$, which is multiplied by the internal representation in multiplier 20. An evaluator 21 then evaluates a linear function h on $X_i \times A$, and the result is inserted by a coefficient insertor 22 into an output register 23. Once the loop is finished, the content of register 23 is output as an external basis representation 24.

Figure 3B:
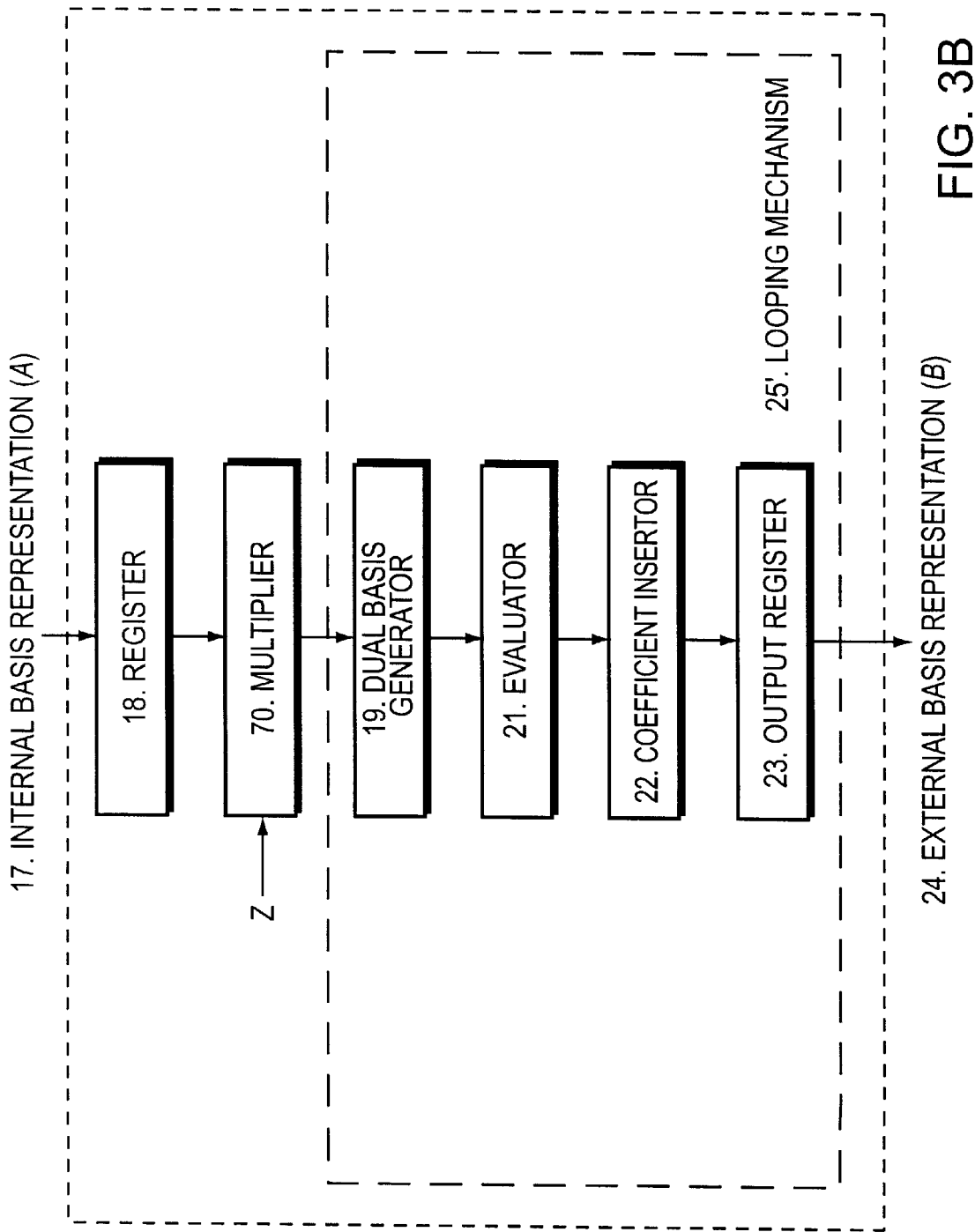

FIG. 3B shows an improvement in the basis converter of FIG. 3A which gives the dual basis generator 19 the value A×Z to scale by instead of Z, which eliminates one multiplication per iteration of the loop. The dual basis generator 19 in FIGS. 3A and 3B could be, for example, a polynomial* basis generator (see FIG. 5), a normal* basis generator (see FIG. 8), or a normal or polynomial basis generator. The evaluator 21 in FIGS. 3A and 3B may be, for example, a circuit which evaluates a linear function, or another suitable evaluator.

As previously noted, the present invention provides algorithms for generating the values for a polynomial* or normal* basis, called GENPOLY* and GENNORMAL*. This leads to two algorithms for polynomial and normal bases, EXPORTPOLYBYGEN*EVAL and EXPORTNORMALBYGEN*EVAL. The latter algorithm was first presented as algorithm EXPORTNORAL* in U.S. application Ser. No. 08/851,045, and is presented again here for completeness.

It should be noted that it is straightforward to generate the dual of the external basis when the external basis is a polynomial* or normal* basis, since the dual is then a scaled polynomial or scaled normal basis. The algorithms for these choices of basis, which one might call EXPORTPOLY*BYGEN*EVAL and EXPORTNNORMAL*BYGEN*EVAL, may thus be considered part of the prior art.

1.2.2 Shift-Extract Method

The Shift-Extract method computes the external representation A by "shifting" an intermediate variable in the external basis, and extracting successive coefficients between the shifts. This follows the same concept as the shift-insert method above, and may be based on the same SHIFT function and an EXTRACT function that obtains a selected coefficient of the external representation. (The EXTRACT function is similar to the h function in the previous method.) The basic form of algorithm for this method is as follows:

```
proc EXPORTBYSHIFTEXTRACT
    for i from m-1 to 0 do
        B[i] ← EXTRACT (A)
        SHIFT (A)
    end for
end proc
```

Again, the direction of the for loop may vary depending on the direction of the shift.

The algorithm has the advantage over EXPORTBYGEN*EVAL that more than one coefficient can readily be processed per iteration, regardless of the basis. If one wishes to reduce the number of shifts by a factor of k, k-fold extraction can be performed at each iteration of the loop. If k does not evenly divide m, some of the extractions may have to be done outside the loop. However, an efficient SHIFT function is required. The shift-extract approach was introduced in U.S. application Ser. No. 08/851,045, and related SHIFT functions are described there for a polynomial and a normal basis, leading to the algorithms EXPORTPOLY and EXPORTNORMAL.

Figure 4A:
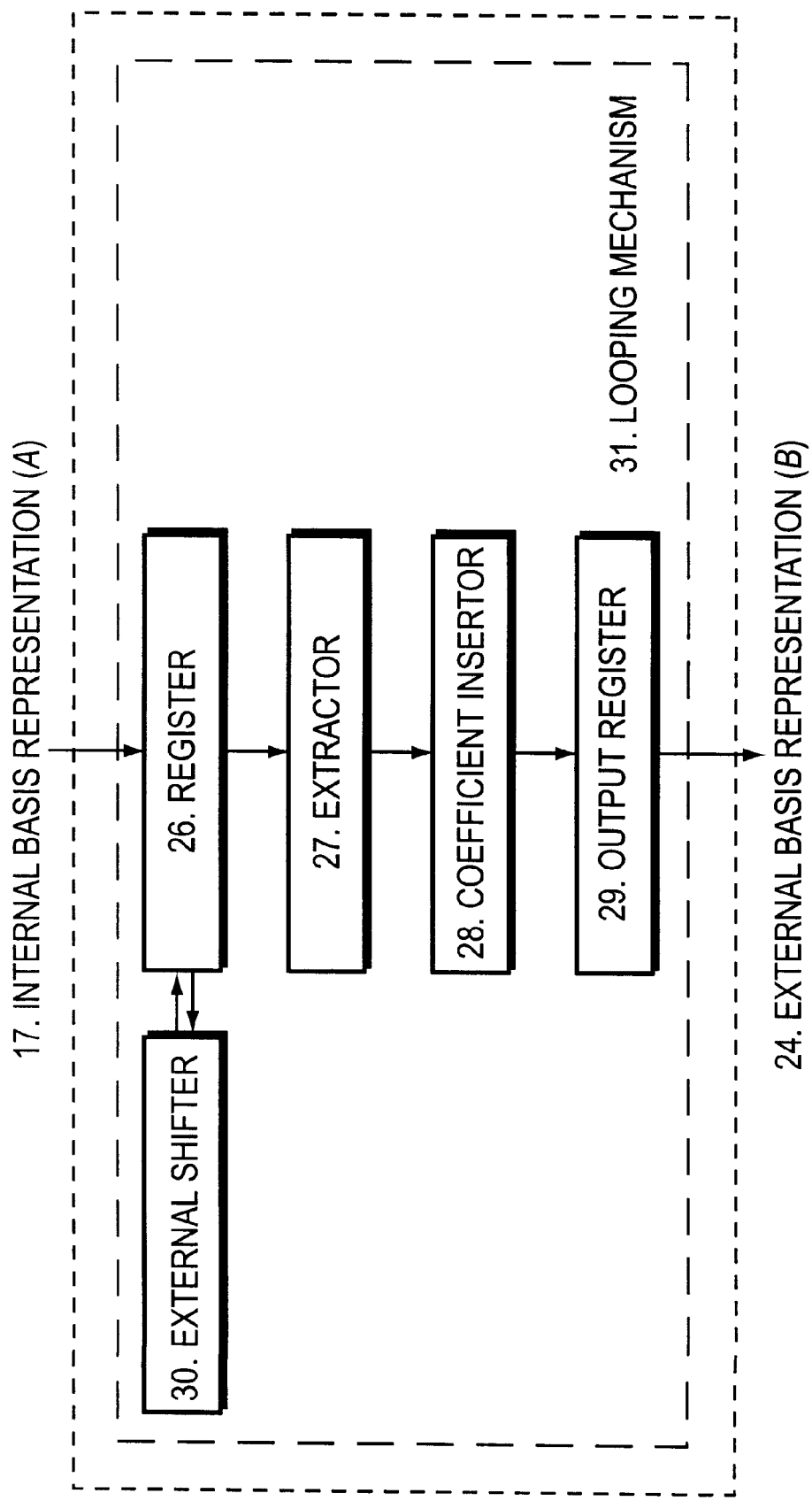
FIGS. 4A and 4B show basis converters which perform export operations using a shift-extract method in accordance with the present invention.

FIG. 4A shows a basis converter implementing the Shift-Extract export algorithm. The internal representation 17 is stored in a register 26. Then, at each step of a looping mechanism 31, an extractor 27 extracts the coefficient B[i], and passes the result to a coefficient insertor 28 which inserts it into an output register 29. Then, the register 26 is shifted by an external shifter 30. Once the loop is finished, the content of register 29 is output as the external basis representation 24.

Figure 4B:
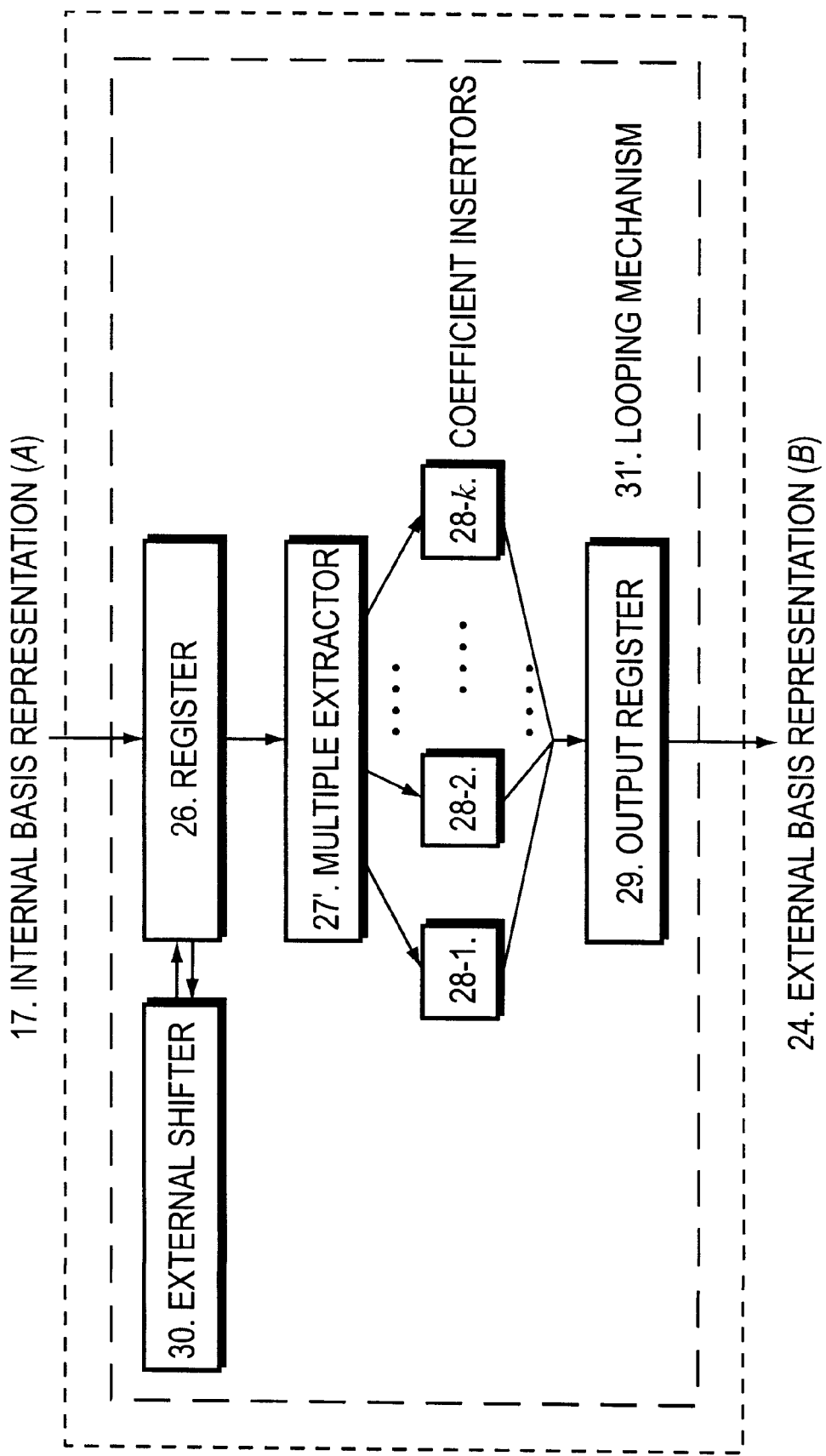

FIG. 4B shows the above-described k-fold optimization of the Shift-Extract algorithm. A multiple extractor 27' extracts k coefficients, which coefficient insertors 28-1, 28-2, . . . , 28-k insert into the output register 29. The multiple extractor 27' may simply be k extractors in parallel, or may have another configuration. The external shifter 30 in FIGS. 4A and 4B could be, for example, a polynomial* basis external shifter (see FIG. 6), a normal* basis external shifter (see FIG. 9), or a normal or polynomial basis external shifter (see U.S. application Ser. No. 08/851,045).

As previously noted, the present invention provides algorithms for shifting in a polynomial* or normal* basis, called SHIFTPOLY* and SHIFTNORMAL*. This leads to two new conversion algorithms, EXPORTPOLY*BYSHIFTINSERT and EXPORTNORMAL*BYSHIFTINSERT. Alternative forms of GENPOLY* and GENNORMAL* and hence EXPORTPOLYBYGEN*EVAL and EXPORTNORMALBYGEN*EVAL may also be obtained from the SHIFT functions, as it is possible to generate the internal representations of the elements of an external basis by repeated application of SHIFT.

1.3 Summary Tables

The following Tables summarize the foregoing techniques and where they are described.

TABLE 1

Import Algorithms.

| | Method | |
|---|---|---|
| Basis | Shift-Insert | Generate-Accumulate |
| POLY | Ser. No. 08/851,045 | Ser. No. 08/851,045 |
| NORMAL | Ser. No. 08/851,045 | Ser. No. 08/851,045 |
| POLY* | present invention | present invention |
| NORMAL* | present invention | present invention |

TABLE 2

Export Algorithms.

| | Method | |
|---|---|---|
| Basis | Shift-Extract | Generate*-Evaluate |
| POLY | Ser. No. 08/851,045 | present invention |
| NORMAL | Ser. No. 08/851,045 | Ser. No. 08/851,045 |
| POLY* | present invention | prior art |
| NORMAL* | present invention | prior art |

2.0 Techniques Involving the Dual of a Polynomial Basis

Let $1, \gamma, \ldots, \gamma^{m-1}$ be a polynomial basis for $GF(q^m)$, and let $h(x)$ be a linear function from $GF(q^m)$ to $GF(q)$. Let $h_0(x)$ be the linear function whose output is the 1-coefficient of x when x is written in the polynomial basis, where the term "1-coefficient" denotes the coefficient of the first basis element. In general, let $h_i(x)$ be the coefficient of the $i^{th}$ basis element of x written in the internal basis. Furthermore, let $\zeta$ be the element of $GF(q^m)$ such that $h_0(x\zeta)=h(x)$. In the remainder of the description, let $\xi_0, \xi_1, \ldots, \xi_{m-1}$ denote the canonical dual basis and $\eta_0, \eta_1, \ldots, \eta_{m-1}$ a dual basis. A formula for the dual basis (i.e., the polynomnial* basis) of the above-described polynomial basis with respect to h is:

$$\eta_0 = \zeta^{-1}\xi_0, \eta_1 = \zeta^{-1}\xi_1, \ldots, \eta_{m-1} = \zeta^{-1}\xi_{m-1}$$

where $\xi_0=1$ and $\xi_i=\xi_{i-1}\gamma^{-1}-h_0(\xi_{i-1}\gamma^{-1})$. When $h=h_0$, $\zeta=1$, and $\eta_0, \eta_1, \ldots, \eta_{m-1}$ equals $\xi_0, \xi_1, \ldots, \xi_{m-1}$ and is called the canonical polynomial* basis. To prove the correctness of the formula, one can use the definition of the dual basis, and induction. First, $$h(1\zeta^{-1}) = h_0(1) = 1,$$

and $$h(\gamma^i\zeta^{-1}) = h_0(\gamma^i) = 0 \text{ for } i > 0.$$

Suppose it is known that the first i–1 elements are correct elements of the dual basis. Then for the $i^{th}$ element:

$$h(\gamma^i\zeta^{-1}\xi_i) = h(\gamma^{i-1}\zeta^{-1}\xi_{i-1}) - h(\gamma^i\zeta^{-1}h_0(\xi_{i-1}\gamma^{-1})) = 1 - h_0(\gamma^i h_0(\xi_{i-1}\gamma^{-1})) = 1,$$

since $h_0(\gamma^i c) = 0$, whenever c is an element of GF(q) and i>0. Furthermore, if $i \neq j$ and $j \neq 0$, $$h(\gamma^i\zeta^{-1}\xi_j) = h(\gamma^{i-1}\zeta^{-1}\xi_{j-1}) - h(\gamma^i\zeta^{-1}h_0(\xi_{j-1}\gamma^{-1})) = 0 - h_0(\gamma^i h_0(\xi_{j-1}\gamma^{-1})) = 0.$$

If j=0, $h(\xi_j\zeta^{-1}) = h_0(\xi_j) = 0$. Thus, the formula for the dual basis is correct. In the following algorithms, Z will generally be the internal representation of $\zeta^{-1}$, Y will be the internal representation of $\zeta$, G will be the internal representation of $\gamma$, H will be the internal representation of $\gamma^{-1}$, and I will be the internal representation of the identity element. The value Z corresponds to the function $h(\epsilon) = h_0(\zeta\epsilon)$, and contains the information specific to the choice of dual basis in the following algorithms. Note that if Z is 0, $h(\epsilon) = h_0(0) = 0$, and therefore, h would not be a suitable linear function for this purpose. However, it may be useful in some applications to have Z=0. Z will also be referred to herein as the scaling factor.

In general, the internal representations of constants such as Z, Y, G and H utilized by the algorithms described herein can be obtained by applying known techniques, such as the correspondence between linear functions and multiplication by group elements, or solution of polynomials. For example, the internal representation G of the generator of an external basis can be computed using information about the internal and external basis, as noted in U.S. application Ser. No. 08/851,045. The general approach to computing such a representation is to find a root, in the internal-basis representation, of an appropriate polynomial corresponding to the external basis. Such root-finding techniques are well known in the prior art. As a further example, the value $V_0$ used in certain of the algorithms described herein, and other elements corresponding to a linear function, can be computed by matrix operations, as described in U.S. application Ser. No. 08/851,045. All these values can be precomputed as part of the setup for the algorithms. Their computation is not necessarily part of the algorithms themselves.

2.1 Efficient Basis Generation

The algorithm GENPOLY* shown below generates the internal representation of the dual basis elements of a polynomial basis, in accordance with an illustrative embodiment of the invention. GENPOLY* is an iterator, it is meant to be called many times in succession. The first time an iterator is called, it starts from the "iter" line. When a yield statement is reached, the iterator returns the value specified by the yield. The next time an iterator is called, it starts immediately after the last yield executed; all temporary variables are assumed to retain their values from one call to the next. An iterator ends when the "enditer" line is reached.

| | |
|---|---|
| Input: | Z, a scaling factor. |
| Output: | $W_0, \ldots, W_{m-1}$, the canonical polynomial* basis scaled by Z. |
| Parameters: | m, the degree of the finite field. |
| Constants: | I, the internal representation of the identity element, |
| | $V_0$, the internal representation of the element such that if $T = A \times V_0$, $T[0] = h_0(A)$, |
| | H, the internal representation of the inverse of the polynomial basis generator. |
| Algorithm: | iter GENPOLY* |
| |     W ← I |
| |     yield Z |
| |     for i from 1 to m-1 do |
| |         W ← W × H |
| |         T ← W × $V_0$ |
| |         W ← W − T[0] × I |
| |         yield W × Z |
| |     endfor |
| | enditer |

Typically, Z will be the internal representation of the scaling factor. However, as noted above, sometimes one may wish to use a value of 0 for Z, which does not correspond to any linear function. If Z does correspond to a linear function, the output is the polynomial* basis with respect to the linear function corresponding to Z. In all cases, the output is the canonical polynomial* basis scaled by Z, and in the case that Z=0, the output will always be zero. At iteration i, the algorithm outputs $W_i$. To show that this is the correct result, note that W at the beginning of the algorithm corresponds to $\xi_0=1$. Proceeding by induction, at each iteration, W is recalculated as WH−$h_0$(WH). So, $\xi_i$ becomes $\xi_i\gamma^{-1}-h_0(\xi_i\gamma^{-1}) = \xi_{i+1}$, which is the correct term. The value $\eta_i = \zeta^{-1}\xi_i$ is then output. This version is a preferred embodiment and generally the most efficient version, but other versions are possible. For instance, one could set W to Z instead of I, and then at each iteration multiply by $Z^{31\ 1}$ before applying the formula, then multiply by Z again afterwards. This turns out to be equivalent to the generation method based on the algorithm SHIFTPOLY* below.

Figure 5:
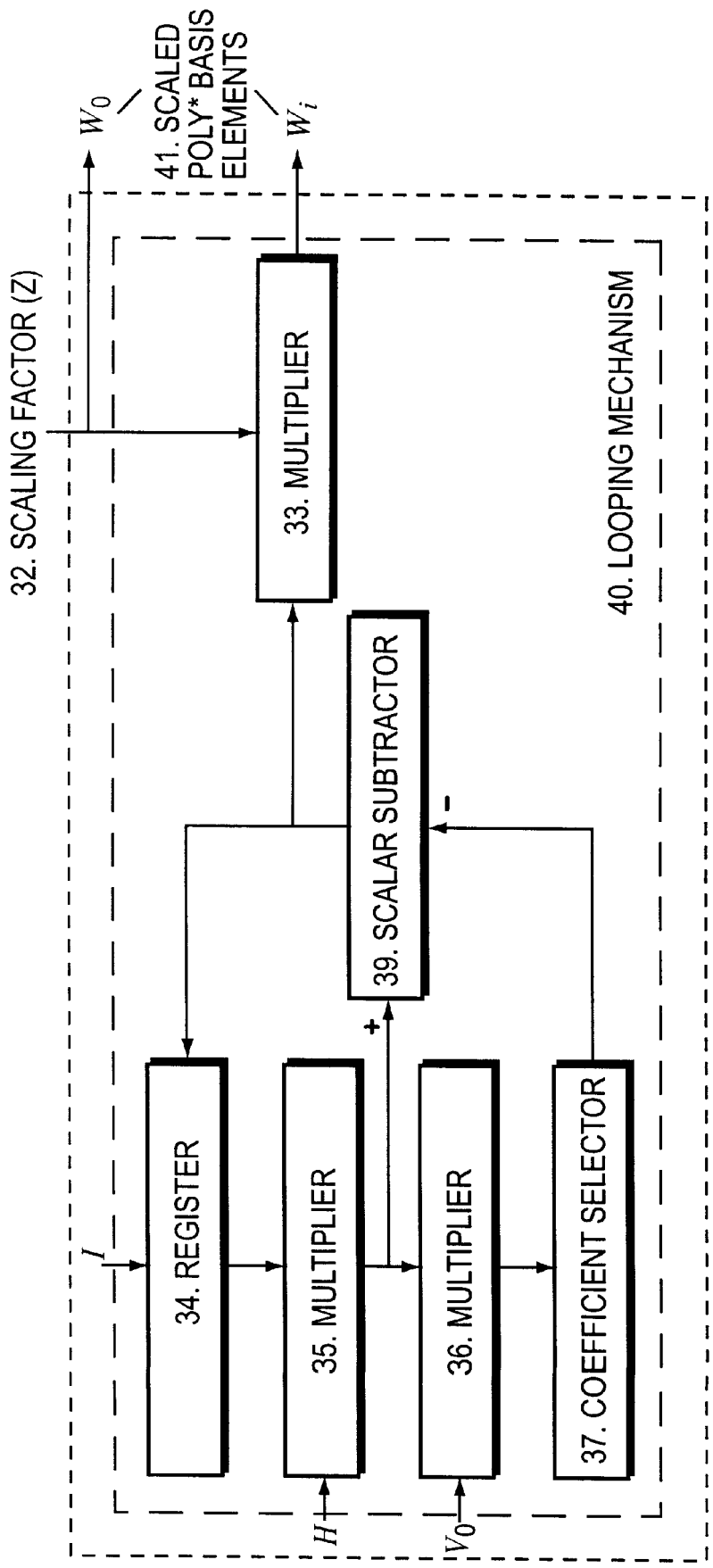
FIG. 5 shows a polynomial* basis generator in accordance with the present invention.

FIG. 5 shows a polynomial* basis generator in accordance with the invention, which implements the above-described iterator GENPOLY*. The value $W_0=Z$ is output first. A register 34 stores the canonical poly* basis, initialized to the identity element I. At each call, this is multiplied by H, then from this result, the value $(W \times V_0)[0] \times I$ is subtracted. The value $(W \times V_0)[0] \times I$ is computed using multipliers 35, 36 and a coefficient selector 37, where W is the value stored in register 34. The subtraction is done by a scalar subtractor 39. Once this subtraction is computed, the result is stored in the register 34, and is multiplied in the multiplier 33 by the scaling factor Z to obtain the output $W_i$, a scaled polynomial* basis element. As in the algorithm GENPOLY*, the value $V_0$ is the element such that $(A \times V_0)[0] = h_0(A)$ in the internal basis, H is the internal representation of $\gamma^{-1}$, and I is the internal representation of the identity element. Alternatively, the multiplier 36 and the coefficient selector 37 may be replaced by a coefficient extractor, i.e., a circuit that selects a coefficient of an element in the external basis, given that element's internal basis representation.

Other forms of GENPOLY* may be readily constructed in accordance with the invention. For example, it may be convenient to perform the steps of the loop in a different order, perhaps starting the value W at a different state, as in the following alternate algorithm:

Algorithm:  iter GENPOLY*
            W ← H
            yield W × ZG
            for i from 1 to m-1 do
                T ← W × $V_0$
                W ← W − T[0] × I
                W ← W × H
                yield W × ZG
            endfor
            enditer This alternate algorithm, which involves a slight rewriting of the steps of the previous algorithm, has the property that it involves the same sequence of steps in the loop (ignoring the yield) as the exemplary polynomial-basis shifter described in U.S. application Ser. No. 08/851,045, which may provide benefits in terms of sharing of computational logic.

Another possible variant of the GENPOLY* algorithm is the following:

Algorithm:  iter GENPOLY*
            W ← Z
            yield W
            for i from 1 to m-1 do
                T ← W × $V_0$YH
                W ← W × H
                W ← W − T[0] × Z
                yield W
            endfor
            enditer This variant avoids the multiplication in the yield, but it presumes the availability of $Y = Z^{-1}$, or at least $V_0YH$. It may be inconvenient or expensive to compute $Z^{-1}$, as would be the case if Z is a variable input value such as the value A to be converted, as in the EXPORTPOLYBYGEN*EVAL algorithm to be described in Section 2.1.2 below.

In the case that the linear function to which Z corresponds is the coefficient at index 0 of the internal basis representation, i.e., the linear function $x_0$ in Section 2.1.2 below, $V_0 = Z$, $V_0Y = I$, and T[0] = W[0], and the first multiplication in the loop in the above variant is not needed. This fact can be exploited to obtain the following variant of the GENPOLY* algorithm that does not require the inverse computation:

Algorithm:  iter GENPOLY*
            W ← $V_0$
            yield Z
            for i from 1 to m-1 do
                W ← W × H
                W ← W − W[0] × $V_0$
                yield W × $ZV_0^{-1}$
            endfor
            enditer In general, the above and other forms of GENPOLY* have the following common characteristics: multiplication by a function of the generator of the polynomial basis, e.g., H; generation of a coefficient, e.g., T[0]; and subtraction of a function of the coefficient from one of the loop variables. The ordering and specifics of these steps may vary in accordance with implementation preference, for instance to simplify one of the steps or to introduce parallelism. Initial values of loop variables will vary correspondingly. The examples of GENPOLY* given above illustrate some of the possible orderings and specifics.

2.1.1 Importing from a Polynomial* Basis by Generate-Accumulate

One application of the above-described GENPOLY* algorithm is in the Generate-Accumulate method for importing from a polynomial* basis.

Input:       B[0], . . ., B[m−1], the external representation to be converted.
Output:      A, the corresponding internal representation.
Parameters:  Any required for GENPOLY*.
Constants:   Z, the internal representation of the scaling factor, and any constants required for GENPOLY*.
Algorithm:   proc IMPORTPOLY*BYGENACCUM
             A ← 0
             i ← 0
             for W in GENPOLY*(Z) do
                 A ← A + B[i] × W
                 i ← i + 1
             endfor
             endproc The IMPORTPOLY*BYGENACCUM algorithm may be implemented using the basis converter of FIG. 1.

2.1.2 Exporting to a Polynomial Basis by Generate*-Evaluate

The algorithm EXPORTPOLYBYGEN*EVAL converts from an internal representation to an external representation in a polynomial basis over the same ground field, primarily with internal-basis operations, and using information largely about the dual of the external basis rather than information about the external basis itself Input:       A, the internal representation to be converted.
Output:      B[0], . . ., B[m−1], the corresponding external representation.
Parameters:  Any required for GENPOLY*.
Constants:   $V_0$, the element such that if $T = A \times V_0$, T[0] = B[0], and any constants required for GENPOLY*.

-continued

```
Algorithm:   proc EXPORTPOLYBYGEN*EVAL
                 A ← A × V₀
                 i ← 0
                 for T in GENPOLY*(A) do
                     B[i] ← T[0]
                     i ← i + 1
                 endfor
             endproc
```

The above version of the EXPORTPOLYBYGEN*EVAL algorithm may be implemented using the basis converter of FIG. 3B. This is generally the most efficient version; it makes two shortcuts which are not essential to the efficiency of the technique. First, it uses the polynomial* basis corresponding to the linear function $x_0$, defined by $x_0(A)[0]$, where A is an internal basis representation; this is easy to evaluate, and results in the Z value being $V_0$. Second, GENPOLY* is passed the value A so that it is not necessary to multiply the result of GENPOLY* by A in an extra step. The algorithm is still efficient without either of these shortcuts. The following is a basic form of the algorithm.

```
Algorithm:   proc EXPORTPOLYBYGEN*EVAL
                 i ← 0
                 for W in GENPOLY*(Z) do
                     B[i] ← h(W × A)
                     i ← i + 1
                 endfor
             endproc
```

This version of the EXPORTPOLYBYGEN*EVAL algorithm may be implemented using the basis converter of FIG. 3A. Here, h is the linear function corresponding to Z. It should be noted that in practice, EXPORTPOLY as described in U.S. application Ser. No. 08/851,045 is likely to be more efficient. However, if GENPOLY* is already available in an implementation, there may be an advantage to choosing this approach.

2.2 Efficient External Shifting

With knowledge of the formula for a polynomial* basis, a method for shifting an element's representation in the polynomial* basis can also be derived. The algorithm uses the recursive formula for generating $\xi_i$ from $\xi_{i-1}$. To prove that this is correct, it is sufficient to show that applying the formula to $\xi_{m-1}$ yields 0. This shifting method works for basis elements, since it simply applies the recursive formula $r(\epsilon) = \epsilon\gamma^{-1} - h_0(\epsilon\gamma^{-1})$ to get all the successive elements.

To prove the above claim, repeated applications of the formula to the identity element 1, and their representations in the polynomial basis, will be considered. Recall that since $\xi_0$ is 1, these various terms are the $\xi_i$. Also recall that if the 1-coefficient of $\epsilon$ written in the polynomial basis is 0, multiplying $\epsilon$ by $\gamma^{-1}$ performs a shifting operation. That is, if $$\epsilon = B[1]\gamma + B[2]\gamma^2 + \ldots + B[m-1]\gamma^{m-1}, \text{ then } \epsilon\gamma^{-1} = B[1] + B[2]\gamma^1 + \ldots + B[m-1]\gamma^{m-2}.$$

First, $\xi_0$ has a nonzero 1-coefficient, but none of the other $\xi_i$ does. Second, notice that $\xi_1 = \gamma^{-1} - h_0(\gamma^{-1})$, so $\xi_1$ has a zero 1-coefficient. After $\xi_1$, each application of the recursive formula performs a shifting-like operation in the polynomial basis, so one more of the coefficients is 0 after each application. So, after m−1 more applications of the recursive formula, the result is $\xi_{m-1}\gamma^{-1} - h_0(\xi_{m-1}\gamma^{-1})$, which must be zero. But if the recursive formula is applied to $\xi_{m-1}$, the result is $$\xi_{m-1}\gamma^{-1} - h_0(\xi_{m-1}\gamma^{-1}) = 0.$$

Now the technique for shifting in the polynomial* basis will be demonstrated. Let $\epsilon$ be any element.

$$\epsilon = B[0]\eta_0 + B[1]\eta_1 + \ldots + B[m-1]\eta_{m-1}$$

$$\zeta\epsilon = B[0]\xi_0 + B[1]\xi_1 + \ldots + B[m-1]\xi_{m-1}$$

$$r(\zeta\epsilon) = B[0]\xi_1 + B[1]\xi_2 + \ldots + B[m-2]\xi_{m-1} + B[m-1]0$$

$$\zeta^{-1}r(\zeta\epsilon) = B[0]\eta_1 + B[1]\eta_2 + \ldots + B[m-2]\eta_{m-1}$$

Thus, if $\epsilon$ is an element, then $\zeta^{-1}r(\zeta\epsilon) = \epsilon\gamma^{-1} - \zeta^{-1}h_0(\zeta\epsilon\gamma^{-1})$ is $\epsilon$ shifted in the polynomial* basis. It should be noted that, in addition to shifting in one direction, it is also possible to shift on the other direction, or to rotate. For example, a formula implementing a right rotate operation for the polynomial* basis is given by:

$$\epsilon\gamma^{-1} - \zeta^{-1}h_0(\zeta\epsilon\gamma^{-1}) + \zeta^{-1}\xi_0 h_0(\zeta\epsilon\gamma^{m-1}).$$

The following is an algorithm for shifting in the polynomial* basis, based on the above-described shifting technique.

```
Input/Output: A, the internal representation of the element to be shifted.
Parameters:   m, the degree of the finite field.
Constants:    YH, the internal representation of ζγ⁻¹,
              I, the internal representation of the identity element,
              V₀, the internal representation of the element such that
                  if T = A × V₀, T[0] = h₀(A),
              Z, the internal representation of the scaling factor.
Algorithm:    proc SHIFTPOLY*
                  A ← A × YH
                  T ← A × V₀
                  A ← A - T[0] × I
                  A ← Z × Z
              endproc
```

Another variation of this algorithm which does not require the constant I is the following:

```
Algorithm:    proc SHIFTPOLY*
                  A ← A × YH
                  T ← A × V₀
                  T ← T[0] × Z
                  A ← A × Z
                  A ← A - T
              endproc
```

A further variation of the SHIFTPOLY* algorithm is as follows:

```
Algorithm:    proc SHIFTPOLY*
                  A ← A × YH
                  T ← A × V₀
                  A ← A × Z
                  A ← A - T[0] × Z
              endproc
```

Another variation of the SHIFTPOLY* algorithm which saves one additional multiplication is the following:

```
Algorithm:      proc SHIFTPOLY*
                    T ← A × V₀YH
                    A ← A × H
                    A ← A - T[0] × Z
                endproc
```

FIG. 6 shows a polynomial* basis external shifter which implements the above-described procedure SHIFTPOLY*. An internal basis representation 42 is first multiplied in the multiplier 43 with the value YH. From this a scalar subtractor 47 subtracts a value obtained by multiplying this value by $V_0$ (in a multiplier 44) and extracting the 1-coefficient (in a coefficient selector 45). Finally, this value is multiplied in a multiplier 48 by Z. The output of multiplier 48 is a shifted internal basis representation 49. As above, Z is the scaling factor, Y is the inverse of the scaling factor, H is the internal representation of $\gamma^{-1}$, and $V_0$ is the element such that $(A \times V_0)[0] = h_0(A)$ in the internal basis, where A is an internal representation and B is its corresponding external representation. If this external shifter is to be implemented for the canonical polynomial* basis, then Z=I and YH=H, and the multiplication in multiplier 48 may be suppressed.

It should also be noted that SHIFTPOLY* can be used to make a new version of GENPOLY*:

```
Algorithm:      iter GENPOLY*BYSHIFT
                    T ← Z
                    yield T
                    for i from 1 to m-1 do
                        SHIFTPOLY*(T)
                        yield T
                    endfor
                enditer
```

The algorithms GENPOLY* and GENPOLY*BYSHIFT are similar in efficiency. Any of the algorithms using GENPOLY* would also work with GENPOLY*BYSHIFT instead. GENPOLY*BYSHIFT, as presented above, assumes that the scaling factor is the same in the dual basis being generated as in the shifter, but it is straightforward to adapt a shifter for a different scaling factor by multiplying the outputs of the shifter by a ratio of scaling factors.

FIG. 7 shows an alternative polynomial* basis generator which implements the above-described GENPOLY*BYSHIFT algorithm. A scaling factor 50 (Z, which is the same as the scaling factor Z used in an external shifter 52) is stored in a register 51, whose contents are yielded initially and for each iteration of a looping mechanism 54. For each successive result, the contents of register 51 are shifted by the external shifter 52. The results are polynomial* basis elements 53, which may be scaled by an additional multiplication. The alternative basis generator of FIG. 7 could be used in any basis conversion application in which the basis generator shown in FIG. 5 could be used. The external shifter 52 could be, for example, the external shifter shown in FIG. 6.

It should be noted that in a case in which YH=I, the first multiplication may be suppressed (and the last multiplication is by H) and in a case in which Z=I, the last multiplication may be suppressed. Various straightforward rearrangements of SHIFTPOLY* can be made to accommodate these and other similar situations.

Similar to GENPOLY*, the above and other forms of SHIFTPOLY* have the common characteristics of multiplication by a function of the generator of the polynomial basis, generation of a coefficient, and subtraction of a function of the coefficient from one of the loop variables. Additional scaling of a value may also be included. Again, the ordering and specifics of these steps may vary in accordance with implementation preference, and the examples of SHIFTPOLY* given above illustrate some of the possible orderings and specifics. It should be noted that many of the approaches given for GENPOLY* are also applicable to SHIFTPOLY*, and vice-versa.

2.2.1 Importing from a Polynomial* Basis by Shift-Insert

The algorithm IMPORTPOLY*BYSHIFTINSERT converts from a polynomial*-basis representation to an internal representation over the same ground field, primarily with internal-basis operations.

```
Input:       B[0], ..., B[m-1], the external representation to
             be converted.
Output:      A, the corresponding internal representation.
Parameters:  m, the degree of the finite field, and any required
             for SHIFTPOLY*.
Constants:   Z, the internal representation of the scaling factor, and any
             other constants required for SHIFTPOLY*.
Algorithm:   proc IMPORTPOLY*BYSHIFTINSERT
                 A ← B[m-1] × Z
                 for i from m-2 downto 0 do
                     SHIFTPOLY*(A)
                     A ← A + B[i]×Z
                 endfor
             endproc
```

The algorithm IMPORTPOLY*BYSHIFTINSERT may be implemented using the basis converter of FIG. 2A.

A possible improvement on this algorithm is to insert multiple coefficients per iteration, as in the basis converter of FIG. 2B. If the value V, the internal representation of $\eta_{m/2}$, were precomputed, assuming without loss of generality that m is even, the algorithm could be run this way:

```
Algorithm:   proc IMPORTPOLY*BYSHIFTINSERT
                 A ← B[m-1] × Z
                 A ← A + B[(m/2) - 1] × V
                 for i from m-2 downto (m/2) do
                     SHIFTPOLY*(A)
                     A ← A + B[i]×Z
                     A ← A + B[i-(m/2)] × V
                 endfor
             endproc
```

This reduces the number of external shifts by a factor of 2. A similar improvement can be made with a factor of k, as mentioned previously, using the basis converter of FIG. 2B.

Another version of the IMPORTPOLY*BYSHIFTINSERT algorithm is as follows:

```
Algorithm:   proc IMPORTPOLY*BYSHIFTINSERT
                 A ← 0
                 for i from m-1 downto (m/2) do
                     SHIFTPOLY*(A)
                     A ← A + B[i]×Z
                     A ← A + B[i-(m/2)] × V
                 endfor
             endproc
```

In this version of the algorithm, the loop is started at m-1 in order to reduce the number of statements in the algorithm.

2.2.2 Exporting to a Polynomial* Basis by Shift-Extract

The algorithm EXPORTPOLY*BYSHIFTEXTRACT converts from an internal representation to an external representation in a dual basis of a polynomial basis over the same ground field, primarily with internal-basis operations.

| | |
|---|---|
| Input: | A, the internal representation to be converted. |
| Output: | B[0], . . . , B[m−1], the corresponding external representation. |
| Parameters: | m, the degree of the finite field, and any required for SHIFTPOLY*. |
| Constants: | $V_{m-1}$, an element such that if $T = A \times V_{m-1}$, $T[0] = B[m-1]$, and any constants required for SHIFTPOLY*. |
| Algorithm: | proc EXPORTPOLY*BYSHIFTEXTRACT<br>  for i from m−1 downto 0 do<br>    T ← A × $V_{m-1}$<br>    B[i] ← T[0]<br>    SHIFTPOLY*(A)<br>  endfor<br>endproc |

The algorithm EXPORTPOLY*BYSHIFTEXTRACT may be implemented using the basis converter of FIG. 4A. This algorithm can be made more efficient by computing multiple coefficients at once and inserting them, as in the basis converter of FIG. 4B. That is, suppose m is divisible by 2 and $V_{m/2-1}$ is the element such that if $T=A \times V_{m/2-1}$, $T[0]=B[m/2-1]$, then the following algorithm also works.

| | |
|---|---|
| Algorithm: | proc EXPORTPOLY*BYSHIFTEXTRACT<br>  for i from m−1 downto m/2 do<br>    T ← A × $V_{m-1}$<br>    B[i] ← T[0]<br>    T ← A × $V_{m/2-1}$<br>    B[i−m/2] ← T[0]<br>    SHIFTPOLY*(A)<br>  endfor<br>endproc |

This is more efficient, since in the second version of the algorithm, there are half as many shifts as in the first version. A similar improvement can be made with a factor of k, as mentioned previously, using the basis converter of FIG. 4B. Another version of the algorithm may be implemented by excluding the shift the last time through the loop.

3.0 Techniques Involving the Dual of a Normal Basis

Let $\gamma, \ldots, \gamma^{q^{m-1}}$ be a normal basis for $GF(q^m)$, and let $h(x)$ be a linear function from $GF(q^m)$ to $GF(q)$. Let $h_0(x)$ be the linear function whose output is the γ-coefficient of x when x is written in the normal basis, where the term "γ-coefficient" denotes the coefficient of the first basis element. Furthermore, let ζ be such that $h_0(x\zeta)=h(x)$. Again, we let $\xi_0, \xi_1, \ldots, \xi_{m-1}$ denote the canonical dual basis and $\eta_0, \eta_1, \ldots, \eta_{m-1}$ denote a dual basis. A formula for the dual basis (i.e., the normal* basis) of the above-described normal basis with respect to h is:

$$\eta_0 = \zeta^{-1}\xi_0, \eta_1 = \zeta^{-1}\xi_1, \ldots, \eta_{m-1} = \zeta^{-1}\xi_{m-1}$$

where $\xi_0=1$, $\xi_i=\sigma^{(q^i-1)/(q-1)}$ and σ is an element such that $h_0(\sigma\gamma)=1$ and $h_0(\sigma\gamma^{q^i})=0$ for $i \neq 1$. When $h=h_0$, $\zeta=1$, and $\eta_0, \eta_1, \ldots, \eta_{m-1}$ equals $\xi_0, \xi_1, \ldots, \xi_{m-1}$ and is called the canonical normal* basis. The element σ is referred to below as the normal* basis generator. To prove that the above dual basis formula is correct, one can use the dual basis property and induction. First, $$h(\zeta^{-1}\gamma)=h_0(\gamma)=1,$$

and $$h(\zeta^{-1}\gamma^{q^j})=h_0(\gamma^{q^j})=0 \text{ for } j \neq 0.$$

To establish the induction, one need only recall the simple result that raising an element ε to the $q^{th}$ power performs a shifting operation in the normal basis. Thus, $h_0(\epsilon)=h_1(\epsilon^q)$ where $h_1(\epsilon)$ is the $\gamma^q$-coefficient of ε written in the normal basis. Now, suppose that each term up to the term given by $\zeta^{-1}\xi_{i-1}=\zeta^{-1}\sigma^{(q^{i-1}-1)/(q-1)}$ satisfies the appropriate dual basis property. Then the same can be derived for i by the following:

$$\gamma^{q^i}\zeta^{-1}\xi_i = \gamma^{q^i}\zeta^{-1}\sigma^{(q^i-1)/(q-1)} = \zeta^{-1}\sigma(\gamma^{q^{i-1}}\sigma^{(q^{i-1}-1)/(q-1)})^q = \zeta^{-1}\sigma(\gamma^{q^{i-1}}\xi_{i-1})^q.$$

Now, by the definition of σ, $h(\zeta^{-1}\sigma\epsilon)=h_0(\sigma\epsilon)=h_1(\epsilon)$, so $$h(\zeta^{-1}\sigma(\gamma^{q^{i-1}}\xi_{i-1})^q)=h_1((\gamma^{q^{i-1}}\xi_{i-1})^q)=h_0(\gamma^{q^{i-1}}\xi_{i-1})=1.$$

With a similar derivation, it follows that $$h(\zeta^{-1}\sigma(\gamma^{q^{j-1}}\xi_{i-1})^q)=h_0(\gamma^{q^{j-1}}\xi_{i-1})=0 \text{ for } i \neq j.$$

This establishes the correctness of the formula for the dual basis and also gives a recursion formula: $\xi_i=\sigma(\xi_{i-1})^q$, where $\xi_i$ is the $i^{th}$ element of the canonical normal* basis. In the following algorithms, G will be the internal representation of γ, S will be the internal representation of σ, and Z will be the internal representation of $\zeta^{-1}$. The value Z corresponds to the function $h(\epsilon)=h_0(\zeta\epsilon)$, and contains the information specific to the choice of dual basis in the following algorithms. Note that if Z is 0, $h(\epsilon)=h_0(0)=0$, and therefore, h would not be a suitable linear function. However, it may be useful in some applications to have Z=0. As noted previously, Z is referred to herein as the scaling factor.

3.1 Efficient Basis Generation

The following algorithm illustrates a technique for efficiently generating the dual of a normal basis in accordance with the invention.

| | |
|---|---|
| Input: | Z, a scaling factor. |
| Output: | $W_0, \ldots, W_{m-1}$, the canonical normal* basis multiplied by Z. |
| Parameters: | m, the degree of the finite field; q, the order of the ground field GF(q). |
| Constants: | S, the internal representation of the normal* basis generator. |
| Algorithm: | iter GENNORMAL*<br>  T ← Z<br>  W ← S<br>  yield T<br>  for i from 1 to m−1 do<br>    T ← T × W<br>    W ← $W^q$<br>    yield T<br>  endfor<br>enditer |

Typically, Z will be the internal representation of the scaling factor. However, sometimes one may wish to use a value 0 for Z, which does not correspond to any linear function. If Z does correspond to a linear function, the output is the normal* basis with respect to the linear function corresponding to Z. In all cases, the output is the canonical normal* basis scaled by Z, and in the case that Z=0, the output will always be zero. Assuming Z is nonzero, the following establishes the correctness of the algorithm. After the first iteration, GENNORMAL* outputs the internal representation of $\zeta^{-1}$. At each successive step, the basis is multiplied by successively higher powers of q of σ, resulting in $\zeta^{-1}$, $\zeta^{-1}\sigma$, $\zeta^{-1}\sigma^{q+1}$, $\zeta^{-1}\sigma^{q^2+1}$, and so on. By the above-described formula, this is the correct list of normal* basis elements.

Figure 8:
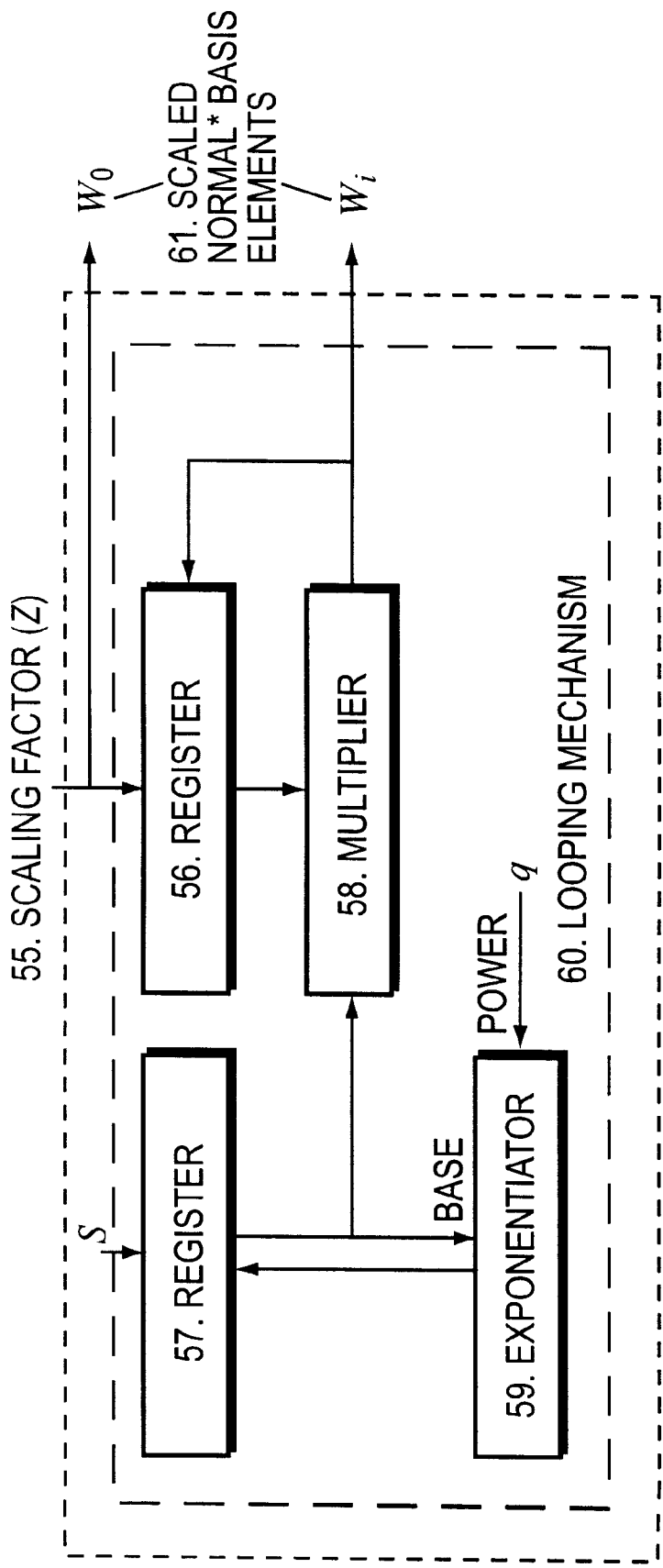
FIG. 8 shows a normal* basis generator in accordance with the present invention.

FIG. 8 shows a normal* basis generator which implements the above-described iterator GENNORMAL*. A register 57 stores one temporary variable, W, initialized to S, the internal representation of σ. A register 56 stores another temporary variable, T. initialized to Z, the scaling factor 55. At each iteration of a looping mechanism 60, the product T×W calculated by a multiplier 58 is output as a scaled normal* basis element. Then, the product is stored as the new value of the register 56, and the value of the register 57 is replaced by $W^q$, calculated by an exponentiator 59 (q is the order of the ground field). The results are the scaled normal* basis elements 61.

Other forms of GENNORMAL* may be readily constructed in accordance with the invention. For example, the following alternate algorithm may be used:

| Algorithm: | iter GENNORMAL* |
|---|---|
| | W ← U |
| | yield W × ZU$^{-1}$ (i.e., yield Z) |
| | for i from 1 to m−1 do |
| |    W ← W$^q$ |
| |    yield W × ZU$^{-1}$ |
| | endfor |
| | enditer |

In this alternate algorithm, U is a $(q-1)^{st}$ root of S, and there are q−1 such roots. Such a root exists since $S^{(q^m-1)/(q-1)}=I$, and can be found by conventional root-finding techniques. This alternate algorithm has the property that it involves the same sequence of steps in the loop (ignoring the yield) as the exemplary normal-basis shifter described in U.S. application Ser. No. 08/851,045 (i.e., an exponentiator), which may provide benefits in terms of sharing of computational logic.

In general, the above and other forms of GENNORMAL* have the following common characteristics: exponentiation of a loop variable, and scaling of a value before it is yielded or multiplication of a loop variable by a previously-yielded value before a new one is needed. The ordering and specifics of these steps may vary in accordance with implementation preference; initial values of loop variables will vary correspondingly. The examples of GENNORMAL* given above illustrate some of the possible orderings and specifics.

3.1.1 Importing from a Normal* Basis by Generate-Accumulate

The algorithm IMPORTNORMAL*BYGENACCUM converts from a normal*-basis representation to an internal representation over the same ground field, primarily with internal-basis operations.

| Input: | B[0], ..., B[m−1], the external representation to be converted. |
|---|---|
| Output: | A, the corresponding internal representation. |
| Parameters: | Any required for GENNORMAL*. |
| Constants: | Z, the internal basis representation of the scaling factor, and any other constants required for GENNORMAL*. |
| Algorithm: | proc IMPORTNORMAL*BYGENACCUM |
| |   A ← 0 |
| |   i ← 0 |
| |   for W in GENNORMAL*(Z) do |
| |     A ← A + B[i] × W |
| |     i ← i + 1 |
| |   endfor |
| | endproc |

The IMPORTNORMAL*BYGENACCUM algorithm may be implemented using the basis converter of FIG. 1.

3.1.2 Exporting to a Normal Basis by Generate*-Evaluate

The algorithm EXPORTNORMALBYGEN*EVAL converts from an internal representation to an external representation in a normal basis over the same ground field, primarily with internal-basis operations, and using information largely about the dual of the external basis rather than information about the external basis itself.

| Input: | A, the internal representation to be converted. |
|---|---|
| Output: | B[0, ..., B[m−1], the corresponding external representation. |
| Parameters: | Any required for GENNORMAL*. |
| Constants: | $V_0$, the internal representation of the element such that if T = A×$V_0$, T[0] = B[0], and any constants required for GENNORMAL*. |
| Algorithm: | proc EXPORTNORMALBYGEN*EVAL |
| |   A ← A × $V_0$ |
| |   i ← 0 |
| |   for T in GENNORMAL*(A) do |
| |     B[i] ← T[0] |
| |     i ← i + 1 |
| |   endfor |
| | endproc |

The above version of the EXPORTNORMALBYGEN*EVAL algorithm may be implemented using the basis converter of FIG. 3B. This is generally the most efficient version; it makes two shortcuts which are not essential to the efficiency of the technique. First, it uses the normal* basis corresponding to the linear function $x_0$, defined by $x_0(A)=A[0]$, where A is an internal basis representation; this is easy to evaluate, and results in the Z value being $V_0$. Second, the value A is passed to GENNORMAL* so as to avoid multiplying the result of GENNORMAL* by A in an extra step. The algorithm is still efficient without either of these shortcuts. The following is a basic form of the algorithm.

| Algorithm: | proc EXPORTNORMALBYGEN*EVAL |
|---|---|
| |   i ← 0 |
| |   for W in GENNORMAL*(Z) do |
| |     B[i] ← h(W × A) |
| |     i ← i + 1 |
| |   endfor |
| | endproc |

This version of the EXPORTNORMALBYGEN*EVAL algorithm may be implemented using the basis converter of FIG. 3A. Here, h is the linear function corresponding to Z. It should be noted that in practice, EXPORTNORMAL as described in the U.S. application Ser. No. 08/851,045 is likely to be more efficient. However, if GENNORMAL* is already available in an implementation, there may be an advantage to choosing this approach. Furthermore, the algorithm EXPORTNORMAL* as described in U.S. application Ser. No. 08/851,045 takes substantially the same approach as EXPORTNORMALBYGEN*EVAL, but the latter is presented here for completeness.

3.2 Efficient External Shifting

The present invention also provides an efficient method for shifting (e.g., doing a rotation) of an element's representation in the normal* basis. A claim that may be desirable to prove is that $\xi_m = \sigma^{(q^m-1)/(q-1)} = 1$. First, applying analysis similar to that by which $\xi_0, \xi_1, \ldots, \xi_{m-1}$ were shown to be correct normal* basis elements, $\sigma(\sigma^{(q^m-1)/(q-1)})^q = \sigma^{(q^m-1)/(q-1)} = \xi_m$, and so $$h_0(\xi_m \gamma^{q^i}) = h_0(\sigma^{(q^m-1)(q-1)}\gamma^{q^i}) = \begin{cases} 1 & \text{if } i-1 = m-1 \\ 0 & \text{otherwise.} \end{cases}$$

By definition of the dual basis, the sequence of values output by $h_0$ as i varies forms the coefficients of $\xi_m = \sigma^{(q^m-1)/(q-1)}$ in the canonical normal* representation. The only nonzero output occurs for i=m, so I $\xi_m = \sigma^{(q^m-1)/(q-1)} = 1 = \xi_0$. (The output is the same for i=m as i=0 since $\gamma^{q^m} = \gamma$.)

The following demonstrates the technique for shifting in the normal* basis.

$$\epsilon = B[0]\eta_0 + \ldots + B[m-2]\eta_{m-2} + B[m-1]\eta_{-1}$$

$$\zeta\epsilon = B[0]\xi_0 + \ldots + B[m-2]\xi_{m-2} + B[m-1]\xi_{m-1}$$

$$\sigma(\zeta\epsilon)^q = B[m-1]\xi_0 + B[0]\xi_1 + \ldots + B[m-2]\xi_{m-1}$$

$$\zeta^{-1}\sigma(\zeta\epsilon)^q = B[m-1]\eta_0 + B[0]\eta_1 + \ldots + B[m-2]\eta_{m-1}$$

Another way to compute $\zeta^{-1}\sigma(\zeta\epsilon)^q$ is to compute $\zeta^{q-1}\sigma\epsilon^q$. This provides a general technique for shifting in a normal* basis. Based on this, the algorithm SHIFTNORMAL* is given as follows.

| | |
|---|---|
| Input/Output: | A, the internal representation to be shifted. |
| Parameters: | m, the degree of the finite field; q, the order of the ground field. |
| Constants: | $SZ^{1-q}$, where S is the internal representation of $\sigma$ and Z is the internal representation of $\zeta^{-1}$, i.e., $SZ^{1-q}$ is the internal representation of $\zeta^{q-1}\sigma$. |
| Algorithm: | proc SHIFTNORMAL* <br>    A ← $A^q$ <br>    A ← A × $SZ^{1-q}$ <br> endproc |

Figures 9, 10:
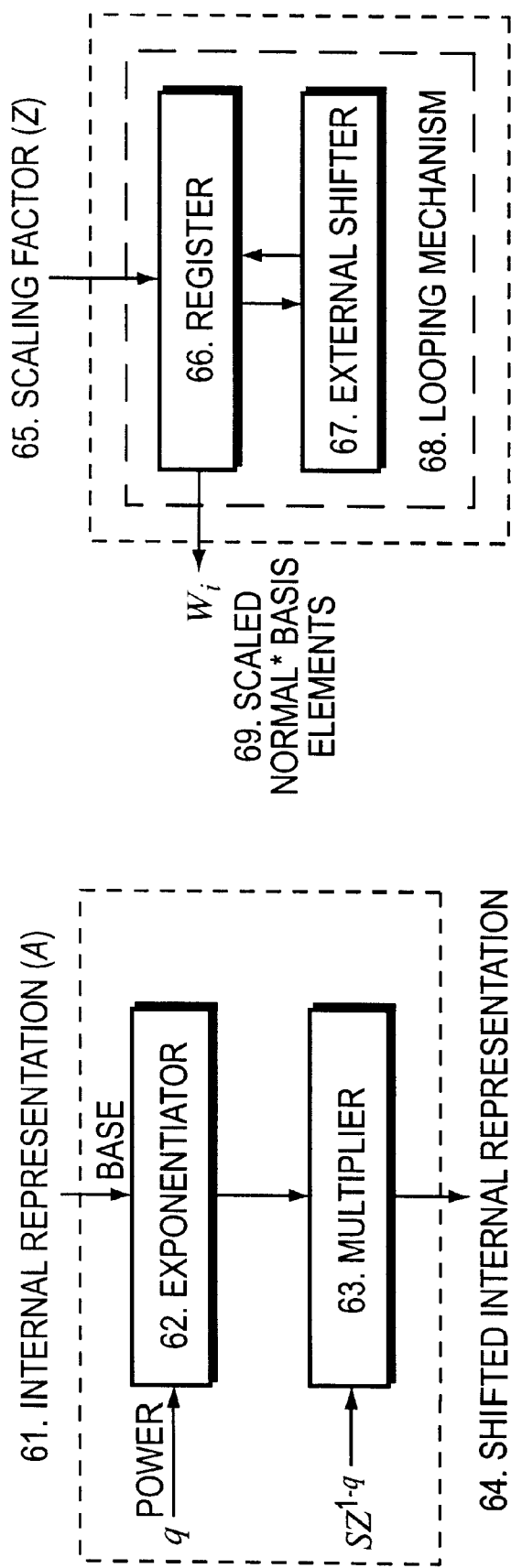
FIG. 9 shows a normal* basis external shifter in accordance with the present invention.
FIGS. 10 and 11 show an alternative normal* basis generator and an alternative normal* basis shifter, respectively, in accordance with the present invention.

FIG. 9 shows a normal* basis external shifter which implements the procedure SHIFTNORMAL*. An internal basis representation 61 is first raised to the power q (q, the order of the finite field, is a parameter) in an exponentiator 62, and is then multiplied by $SZ^{1-q}$ in a multiplier 63, where S is the internal representation of $\sigma$, and Z is the scaling factor. The result 64 is the shifted internal representation.

It should also be noted that SHIFTNORMAL* can be used to make a new version of GENNORMAL*.

| | |
|---|---|
| Algorithm: | iter GENNORMAL*BYSHIFT <br>    T ← Z <br>    yield T <br>    for i from 1 to m-1 do <br>       SHIFTNORMAL*(T) <br>       yield T <br>    endfor <br> enditer |

The algorithms GENNORMAL* and GENNORMAL*BYSHIFT are similar in efficiency, and selection of one or the other involves a tradeoff between number of variables and parellelizability. Any of the algorithms using GENNORMAL* would also work with GENNORMAL*BYSHIFT instead. GENNORMAL*BYSHIFT, as presented above, assumes that the scaling factor is the same in the dual basis being generated as in the shifter, but it is straightforward to adapt a shifter for a different scaling factor by multiplying the outputs of the shifter by a ratio of scaling factors.

FIG. 10 shows an alternative normal* basis generator which implements the iterator GENNORMAL*BYSHIFT. Its structure is exactly the analog of the structure of GENPOLY*BYSHIFT. A scaling factor 65 is stored in a register 66, whose contents are yielded initially and for each iteration of a looping mechanism 68. For each successive result, the contents of the register 66 are shifted by an external shifter 67. The results are the normal* basis elements 69, and may be scaled by an additional multiplication. The basis generator of FIG. 10 could be used in any basis conversion application in which the basis converter of FIG. 8 could be used. The external shifter 68 could be, for example, the external shifter shown in FIG. 9.

Figure 11:
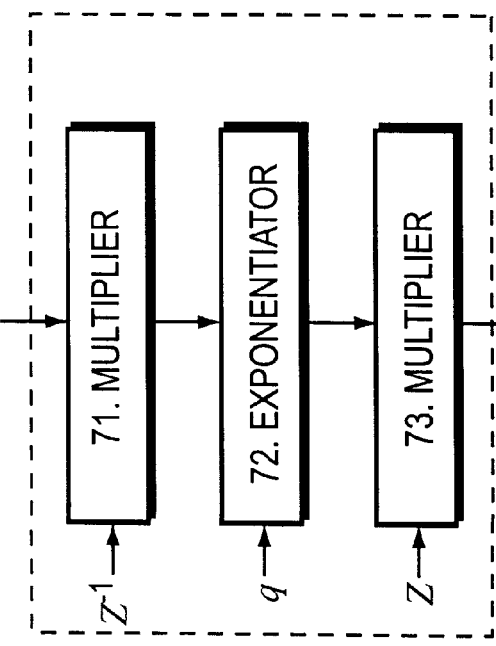

FIG. 11 shows an alternative external basis shifter which implements an alternative version of SHIFTNORMAL*. This external shifter computes $A^q SZ^{1-q}$ by first multiplying A by $Z^{-1}$ using a multiplier 71, then raising the result to the $q^{th}$ power using an exponentiator 72, and finally, multiplying that result by SZ, using a multiplier 73.

It should be noted that in a case in which $SZ^{1-q}=I$, the multiplication in the original version of SHIFTNORMAL* given above may be suppressed, and if SZ=I, the multiplication may be suppressed in the above-noted alternative version of SHIFTNORMAL*. In this case, $Z^{-1}=S$, so the first multiplication is by S. Moreover, the multiplication may be carried out in other ways in any case. It may, for example, be performed only before the exponentiation, e.g., by multiplying by a qth root of $SZ^{1-q}$.

In general, the above and other forms of SHIFTNORMAL* have the common characteristics of exponentiation and multiplication by a function of the generator of the dual basis, e.g., S. Multiplication by a function of a scaling factor may also be included. The ordering and specifics of these steps may vary in accordance with implementation preference, and the examples of SHIFTNORMAL* given above illustrate some of the possible orderings and specifics. Inasmuch as a version of GENNORMAL can be constructed from SHIFTNORMAL*, many of the approaches given above for SHIFTNORMAL* can be applied to GENNORMAL* as well.

3.2.1 Importing from a Normal* Basis by Shift-Insert

The algorithm IMPORTNORMAL*BYSHIFTINSERT converts from a normal*-basis representation to an internal representation over the same ground field, primarily with internal-basis operations.

| | |
|---|---|
| Input: | B[0], ... , B[m−1], the external representation to be converted. |
| Output: | A, the corresponding internal representation |
| Parameters: | m, the degree of the finite field. |
| Constants: | Z, the internal representation of the scaling factor, and any other constants required for SHIFTNORMAL*. |
| Algorithm: | proc IMPORTNORMAL*BYSHIFTINSERT<br>  A ← B[m−1] × Z<br>  for i from m−2 downto 0 do<br>    SHIFTNORMAL*(A)<br>    A ← A + B[i] × Z<br>  endfor<br>endproc |

The algorithm IMPORTNORMAL*BYSHIFTINSERT may be implemented using the basis converter of FIG. 2A. The algorithm works by inserting one coefficient into the internal representation, externally rotating the internal representation to make space for another coefficient, and repeating. An improvement on this algorithm is to insert multiple coefficients per iteration, as in the basis converter of FIG. 2B. If the value $V=ZS^{(q^{m/2}-1)/(q-1)}$, the internal representation of $\eta_{m/2}$, were precomputed, assuming without loss of generality that m is even, the algorithm could be run this way:

| | |
|---|---|
| Algorithm: | proc IMPORTNORMAL*BYSHIFTINSERT<br>  A ← B[m−1] × Z<br>  A ← A + B[(m/2) − 1] × V<br>  for i from m−2 downto m/2 do<br>    SHIFTNORMAL*(A)<br>    A ← A + B[i] × Z<br>    A ← A + B[i−(m/2)] × V<br>  endfor<br>endproc |

This second version reduces the number of external shifts by a factor of 2. A similar improvement can be made with a factor of k, as mentioned previously, using the basis converter of FIG. 2B.

Another version of the IMPORTNORMAL*BYSHIFTINSERT algorithm is as follows:

| | |
|---|---|
| Algorithm: | proc IMPORTNORMAL*BYSHIFTINSERT<br>  A ← 0<br>  for i from m−1 downto (m/2) do<br>    SHIFTNORMAL*(A)<br>    A ← A + B[i] × Z<br>    A ← A + B[i−(m/2)] × V<br>  endfor<br>endproc |

In this version of the algorithm, the loop is started at m−1 in order to reduce the number of statements in the algorithm.

3.2.2 Exporting to a Normal* Basis by Shift-Extract

The algorithm EXPORTNORMAL*BYSHIFTEXTRACT converts from an internal representation to an external representation in a dual basis of a normal basis over the same ground field, primarily with internal-basis operations.

| | |
|---|---|
| Input: | A, the internal representation to be converted. |
| Output: | B[0], ... , B[m−1], the corresponding external representation. |
| Parameters: | m, the degree of the finite field, and any parameters required for SHIFTNORMAL*. |
| Constants: | $V_{m-1}$, an element such that if $T = A \times V_{m-1}$, $T[0] = B[m−1]$, and any constants required for SHIFTNORMAL*. |
| Algorithm: | proc EXPORTNORMAL*BYSHIFTEXTRACT<br>  for i from m−1 downto 0 do<br>    T ← A × $V_{m-1}$<br>    B[i] ← T[0]<br>    SHIFTNORMAL*(A)<br>  endfor<br>endproc |

The algorithm EXPORTNORMAL*BYSHIFTEXTRACT may be implemented using the basis converter of FIG. 4A. The algorithm works by successively extracting a coefficient from the external representation and rotating the external representation. This algorithm can be made more efficient by computing multiple coefficients at once and inserting them, as in the basis converter of FIG. 4B. That is, suppose m is divisible by 2, and $V_{m/2-1}$ is the element such that if $T=A \times V_{m/2-1}$, $T[0]=B[m/2−1]$, then this algorithm also works:

| | |
|---|---|
| Algorithm: | proc EXPORTNORMAL*BYSHIFTEXTRACT<br>  for i from m−1 downto m/2 do<br>    T ← A × $V_{m-1}$<br>    B[i] ← T[0]<br>    T ← A × $V_{m/2-1}$<br>    B[i−m/2] ← T[0]<br>    SHIFTNORMAL*(A)<br>  endfor<br>endproc |

This is more efficient, since in the second version of the algorithm, there are half as many shifts as in the first version. A similar improvement can be made with a factor of k, as mentioned previously, using the basis converter of FIG. 4B. Another version of the algorithm may be implemented by excluding the shift the last time through the loop.

It should be noted that the algorithms described above may be extended to the case in which the internal and external basis have different ground fields, as described in U.S. application Ser. No. 08/851,045. For example, if a ground field is represented in terms of polynomial* or normal* basis, the techniques described in U.S. application Ser. No. 08/851,045 can be applied to process subcoefficients during import and/or export operations.

4.0 Applications

The basis converters described herein may be implemented in the form of a processor which operates in conjunction with a memory to control the processing operations of the basis converter. The processor and memory may be part of a user terminal in a cryptographic system such as those to be described in conjunction with FIGS. 12A and 12B below. The processor and memory may be implemented in a personal desktop or portable computer, a microcomputer, a mainframe computer, a workstation, telephone, facsimile machine, television set top box or any other type of processing or communications terminal or device. The processor may be a microprocessor, central processing unit (CPU), application-specific integrated circuit (ASIC) or any other suitable digital data processor. The basis converter and the elements thereof may be configured as software modules executed by the processor, as separate dedicated hardware modules, or as various combinations of software and hardware.

The basis conversion techniques of the present invention can be implemented in a wide variety of cryptographic applications such as, for example, the applications described in U.S. application Ser. No. 08/851,045. The techniques of the present invention are particularly well suited for use in cryptographic applications which make use of elliptic curve cryptosystems and/or finite field arithmetic. Moreover, because the invention provides basis conversion techniques which require relatively little storage capacity as compared to conventional techniques, the invention is also well suited for use in memory-limited cryptographic applications.

Figure 12B:
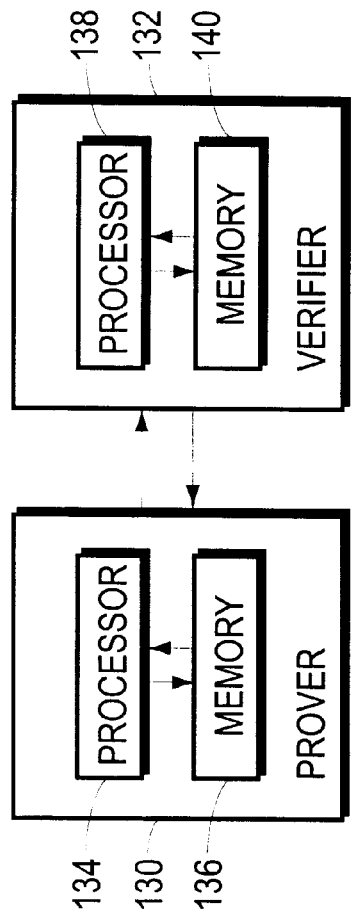
FIGS. 12A and 12B illustrate exemplary cryptographic systems in which the basis conversion techniques of the present invention may be implemented.
Figure 12A:
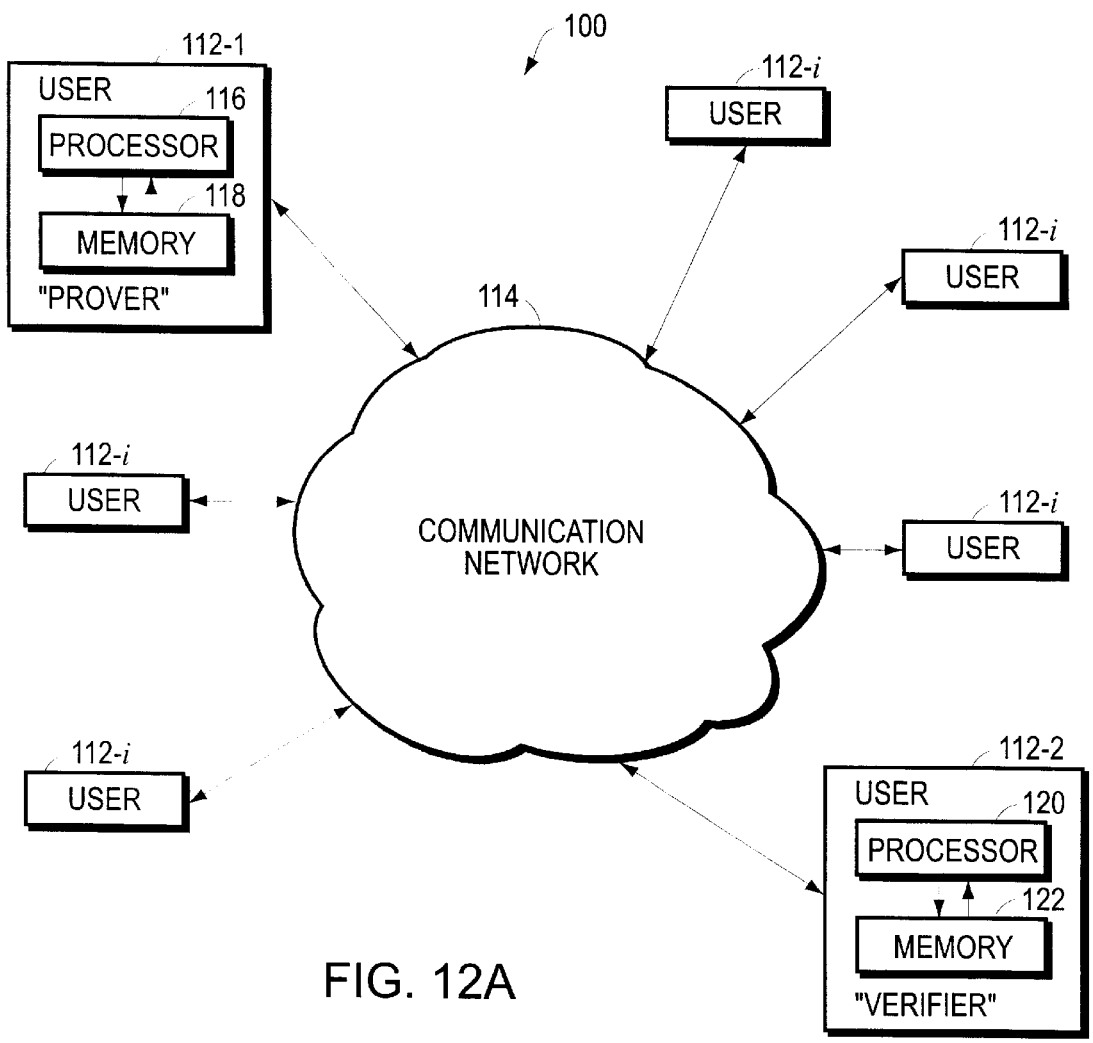

FIG. 12A shows a communication system 100 in which user identification or digital signature techniques utilizing basis conversion in accordance with the invention may be implemented. The system 100 is configured in the manner described in U.S. patent application Ser. No. 08/954,712 filed Oct. 20, 1997 and entitled "Secure User Identification Based on Constrained Polynomials," which is incorporated by reference herein. Although the illustrative user identification and digital signature techniques described in application Ser. No. 08/954,712 did not make use of basis conversion, other similar techniques may be configured to utilize basis conversion.

The system 100 includes a number of different users 112-$i$, $i$=1, 2, ... N, which communicate with each other via a communication network 114. The users 112-$i$ may represent personal desktop or portable computers, microcomputers, mainframe computers, workstations, telephones, facsimile machines, personal communication devices, digital notepads, television set top boxes or any other type of communication terminals in various combinations. The communication network 114 may represent a global computer network such as the Internet, a wide area network (WAN), a local area network (LAN), a satellite network, a telephone or cable network, or various combinations of these and other types of networks. The network may operate using conventional data transfer techniques including but not limited to asynchronous transfer mode (ATM), synchronous optical network/synchronous digital hierarchy (SONET/SDH) and/or transmission control protocol/Internet protocol (TCP/IP).

A particular one of the users 112-$i$ in the system 100 is designated in this illustration as a prover 112-1. The prover 112-1 includes a processor 116 bidirectionally coupled to a memory 118. Another of the users 112-$i$ in system 110 is designated a verifier 112-2. The verifier 112-2 includes a processor 120 bidirectionally coupled to a memory 122. The processors 116, 120 are used to generate the information communicated between the prover 112-1 and verifier 112-2 during identification and digital signature techniques. The memories 118, 122 store intermediate results and other information used in the identification and digital signature techniques. It should be noted that in general any of the users 112-$i$ of system 110 may be acting as either a prover or a verifier or both at any given time. For example, the user 112-2 may be verifying user 112-1 while also acting as a prover to another user 112-$i$ and a verifier of yet another user 112-$i$. The processors 116, 120 in conjunction with their respective memories 118, 122 may be used to implement any of the basis conversion operations illustrated in FIGS. 1 through 11 and described in the previous sections.

FIG. 12B shows another exemplary cryptographic system in which the basis conversion techniques of the invention may be implemented. In this embodiment, a prover 130 and verifier 132 are configured to communicate as shown. The prover 130 includes a processor 134 and a memory 136, and the verifier 132 includes a processor 138 and a memory 140. The prover 130 may be implemented as a smart card, while the verifier 132 is a processing terminal with a card reader designed to receive the smart card. The interconnection between the prover 130 and the verifier 132 in FIG. 12B may therefore represent a temporary interconnection which is present when a smart card is inserted into a card reader. User identification and digital signature techniques similar to those described in U.S. application Ser. No. 08/954,712, as well as many other types of cryptographic techniques, may utilize the basis conversion operations of the present invention. The processors 134, 138 in conjunction with their respective memories 136, 140 may be used to implement any of the basis conversion operations illustrated in FIGS. 1 through 11 and described in the previous sections.

It should be emphasized the basis conversion techniques described herein are exemplary and should not be construed as limiting the present invention to any particular embodiment or group of embodiments. Numerous alternative embodiments within the scope of the appended claims will be readily apparent to those skilled in the art.

What is claimed is:

1. An apparatus for determining elements in a dual of a normal basis for a finite field, the apparatus comprising:

an exponentiator which is operative to raise one of an input value and an output of a multiplier to a power; and the multiplier which is operative to multiply one of the input value and an output of the exponentiator by a function of a generator of the dual basis, wherein the multiplier and exponentiator are configured to operate such that one of the multiplier and exponentiator generates an output value corresponding to a shifted version of the input value in the dual of the normal basis.

2. The apparatus of claim 1 wherein the function of a generator of the dual basis is also a function of a scaling value.

3. The apparatus of claim 1 wherein the multiplier multiplies the input value by a function of the generator of the dual basis, and the exponentiator raises an output of the multiplier to a power to generate the output value.

4. The apparatus of claim 1 wherein the exponentiator computes a value representing the input value raised to a power, and the multiplier generates the output value as a product of the value computed by the exponentiator multiplied by a function of the generator.

5. The apparatus of claim 1 wherein the operations of the exponentiator and multiplier are repeated to provide additional output values corresponding to shifted versions of the input value in the dual of the normal basis, and wherein the output values are used to generate elements of the dual of the normal basis.

6. The apparatus of claim 1 further including a looping mechanism operative to repeat the operations of the exponentiator and multiplier so as to generate a plurality of shifted versions of elements in the dual of the normal basis, wherein each non-initial iteration of the loop starts with the input value set to the output value generated in the previous iteration of the loop.

7. The apparatus of claim 1 wherein the input value initially corresponds to an identity element and the dual of the normal basis is a canonical normal basis.

8. The apparatus of claim 1 wherein an initial value of the input value corresponds to a scaling factor.

9. The apparatus of claim 8 wherein the scaling factor corresponds to a linear function.

10. The apparatus of claim 1 wherein the multiplier multiplies one of the input value and the output value by a function $SZ^{1-q}$ where S is a generator of the dual of the normal basis, Z is a scaling factor and q is a prime or a power of a prime.

11. The apparatus of claim 1 wherein the multiplier multiplies one of the input value and the output value by a qth root of $SZ^{1-q}$ where S is a generator of the dual of the normal basis, Z is a scaling factor and q is a prime or a power of a prime.

12. The apparatus of claim 1 wherein at least one of the exponentiator and multiplier are implemented in a processor which is operative to convert a representation in an external dual of a normal basis to a representation in an internal basis using a generate-accumulate algorithm.

13. The apparatus of claim 1 wherein at least one of the exponentiator and multiplier are implemented in a processor which is operative to convert a representation in an internal basis to a representation in an external normal basis using a generate-evaluate algorithm which generates a dual of the normal basis.

14. The apparatus of claim 1 wherein at least one of the exponentiator and multiplier are implemented in a processor which is operative to convert a representation in an external dual of a normal basis to a representation in an internal basis using a shift-insert algorithm.

15. The apparatus of claim 1 wherein at least one of the exponentiator and multiplier are implemented in a processor which is operative to convert a representation in an internal basis to a representation in an external dual of a normal basis using a shift-extract algorithm.

16. An apparatus for determining elements of a dual of a normal basis for a finite field, the apparatus comprising:
an exponentiator which raises an input value to a power, wherein the output of the exponentiator is applied to its input such that the exponentiator repeats the raising to a power operation a designated number of times; and
a multiplier which is operative to multiply an output of the exponentiator, generated after the designated number of repetitions, by a scaling factor which is a function of a $(q-1)^{st}$ root of S, where S is a generator of the normal basis and q is a prime or a power of a prime, such that an output of the multiplier corresponds to an element of the dual of the normal basis.

17. The apparatus of claim 16 wherein an initial value of the input value corresponds to a $(q-1)^{st}$ root of S.

18. The apparatus of claim 16 wherein the operations of the exponentiator and multiplier are repeated to generate additional elements of the dual of the normal basis.

19. An apparatus for determining elements of a dual of a normal basis for a finite field, the apparatus comprising:
an exponentiator which raises an input value to a power, wherein the output of the exponentiator is applied to its input such that the exponentiator repeats the raising to a power operation a designated number of times; and
a multiplier which is operative to multiply an output of the exponentiator, generated after the designated number of repetitions, by one of an initial value and a previously-generated output of the multiplier, such that a current output of the multiplier corresponds to an element of the dual of the normal basis.

20. The apparatus of claim 19 wherein the operations of the exponentiator and multiplier are repeated to generate additional elements of the dual of the normal basis.

21. The apparatus of claim 19 wherein the input value is initially set to a function of a generator of the dual basis.

22. The apparatus of claim 19 wherein the input value initially corresponds to an identity element.

23. The apparatus of claim 19 wherein the initial value corresponds to a scaling factor.

24. The apparatus of claim 19 wherein the initial value corresponds to an identity element.

25. A method for determining elements in a dual of a normal basis for a finite field, the method comprising:
exponentiating one of a signal corresponding to an input value and a signal corresponding to an output of a multiplier in an exponentiator; and
multiplying one of a signal corresponding to the input value and a signal corresponding to an output of the exponentiator by a function of a generator of the dual basis in the multiplier, wherein the multiplier and exponentiator are configured to operate such that one of the multiplier and exponentiator generates an output value corresponding to a shifted version of the input value in the dual of the normal basis.

26. A method for determining elements of a dual of a normal basis for a finite field, the method comprising:
raising a signal corresponding to an input value to a power in an exponentiator, wherein the output of the exponentiator is applied to its input such that the exponentiator repeats the raising to a power operation a designated number of times; and
multiplying an output of the exponentiator, generated after the designated number of repetitions, in a multiplier by a scaling factor which is a function of a $(q-1)^{st}$ root of S, where S is a generator of the normal basis and q is a prime or a power of a prime, such that an output of the multiplier corresponds to an element of the dual of the normal basis.

27. A method for determining elements of a dual of a normal basis for a finite field, the method comprising:
raising a signal corresponding to an input value to a power in an exponentiator, wherein the output of the exponentiator is applied to its input such that the exponentiator repeats the raising to a power operation a designated number of times; and
multiplying an output of the exponentiator, generated after the designated number of repetitions, in a multiplier by one of an initial value and a previously-generated output of the multiplier, such that a current output of the multiplier corresponds to an element of the dual of the normal basis.

28. A method for determining elements in a dual of a normal basis for a finite field, the method comprising:
(a) multiplying a signal corresponding to an input value by a first function;
(b) raising a signal corresponding to a value resulting from step (a) to a power; and
(c) multiplying a signal corresponding to a value resulting from step (b) by a second function thereby generating an output value corresponding to a shifted version of the input value in the dual of the normal basis, wherein one of the first function and the second function is a function of a generator of the dual of the normal basis.

29. The method of claim 28 further comprising using the output value generated in step (c) as the input value in step (a) and repeating steps (a), (b), and (c).

30. The method of claim 28 wherein one of the first function and the second function is a function of a scaling factor.

31. The method of claim 30 wherein the first function is a function of a scaling factor and the second function is a function of a generator of the dual of the normal basis and the scaling function.

* * * * *